US009620827B2

(12) United States Patent
Houchin-Miller et al.

(10) Patent No.: US 9,620,827 B2
(45) Date of Patent: Apr. 11, 2017

(54) THERMAL MANAGEMENT SYSTEM FOR A BATTERY SYSTEM

(75) Inventors: Gary P. Houchin-Miller, Milwaukee, WI (US); James S. Symanski, Greenfield, WI (US); Craig W. Rigby, Bayside, WI (US); Thomas J. Dougherty, Waukesha, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 893 days.

(21) Appl. No.: 13/704,191

(22) PCT Filed: Jun. 13, 2011

(86) PCT No.: PCT/US2011/040204
§ 371 (c)(1),
(2), (4) Date: Apr. 25, 2013

(87) PCT Pub. No.: WO2011/159619
PCT Pub. Date: Dec. 22, 2011

(65) Prior Publication Data
US 2013/0207617 A1 Aug. 15, 2013

Related U.S. Application Data

(60) Provisional application No. 61/354,608, filed on Jun. 14, 2010.

(51) Int. Cl.
*H02J 7/04* (2006.01)
*H01M 10/6551* (2014.01)
(Continued)

(52) U.S. Cl.
CPC ....... *H01M 10/5046* (2013.01); *B60L 3/0076* (2013.01); *B60L 11/123* (2013.01);
(Continued)

(58) Field of Classification Search
USPC .......................................... 320/150
See application file for complete search history.

(56) References Cited

U.S. PATENT DOCUMENTS

| 4,314,008 A | 2/1982 | Blake |
| 7,056,616 B2 | 6/2006 | Moores, Jr. et al. |
| (Continued) | | |

FOREIGN PATENT DOCUMENTS

| CN | 101707265 | 5/2010 |
| CN | 101577354 | 4/2011 |
| (Continued) | | |

OTHER PUBLICATIONS

International Search Report and Written Opinion of International Application No. PCT/US2011/040204, dated Feb. 9, 2012, 7 pages.
(Continued)

*Primary Examiner* — Robert Grant
(74) *Attorney, Agent, or Firm* — Fletcher Yoder, P.C.

(57) ABSTRACT

A battery system includes a plurality of electrochemical cells provided within a housing. The battery system also includes a thermal management system configured to provide at least one of heating or cooling to the electrochemical cells. The thermal management system includes a solid state coating having a first metal and a second metal different from the first metal. The solid state coating is configured to pass a current therethrough to create a temperature differential across a first surface of the solid state coating and a second surface of the solid state coating to provide the at least one of heating or cooling to the cells.

26 Claims, 16 Drawing Sheets

(51) Int. Cl.

| | | |
|---|---|---|
| *B60L 3/00* | (2006.01) | |
| *B60L 11/12* | (2006.01) | |
| *B60L 11/14* | (2006.01) | |
| *B60L 11/18* | (2006.01) | |
| *G05D 23/19* | (2006.01) | |
| *H01M 2/10* | (2006.01) | |
| *H01M 10/42* | (2006.01) | |
| *H01M 10/44* | (2006.01) | |
| *H02J 7/00* | (2006.01) | |
| *H01M 10/625* | (2014.01) | |
| *H01M 10/615* | (2014.01) | |
| *H01M 10/613* | (2014.01) | |

(52) U.S. Cl.
CPC ........... *B60L 11/14* (2013.01); *B60L 11/1874* (2013.01); *B60L 11/1875* (2013.01); *B60L 11/1877* (2013.01); *G05D 23/1919* (2013.01); *H01M 2/1094* (2013.01); *H01M 10/4207* (2013.01); *H01M 10/441* (2013.01); *H01M 10/613* (2015.04); *H01M 10/615* (2015.04); *H01M 10/625* (2015.04); *H01M 10/6551* (2015.04); *H02J 7/007* (2013.01); *B60L 2270/46* (2013.01); *Y02T 10/6217* (2013.01); *Y02T 10/705* (2013.01); *Y02T 10/7005* (2013.01); *Y02T 10/7077* (2013.01)

(56) References Cited

U.S. PATENT DOCUMENTS

| | | | |
|---|---|---|---|
| 2003/0064283 A1* | 4/2003 | Uemoto | ............. H01M 2/0202 429/149 |
| 2006/0216582 A1 | 9/2006 | Lee et al. | |
| 2008/0268333 A1 | 10/2008 | Barrella et al. | |
| 2009/0142654 A1 | 6/2009 | Fakers et al. | |
| 2009/0200987 A1* | 8/2009 | Saito | ..................... B60L 3/0046 320/153 |
| 2013/0196198 A1 | 8/2013 | Guner et al. | |

FOREIGN PATENT DOCUMENTS

| | | |
|---|---|---|
| JP | 11-176487 | 7/1999 |
| JP | 2006-127920 | 5/2006 |

OTHER PUBLICATIONS

Office Action issued for European Application No. 11796249.8 dated Jun. 23, 2015.

\* cited by examiner

THERMAL MANAGEMENT SYSTEM FOR A BATTERY SYSTEM

CROSS-REFERENCE TO RELATED PATENT APPLICATIONS

This application is a U.S. National Phase Application of International Application No. PCT/US2011/040204, filed Jun. 13, 2011, which claims the benefit of and priority to U.S. Provisional Patent Application No. 61/354,608, filed Jun. 14, 2010, which is incorporated herein by reference in its entirety.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more of the challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, a battery system includes a plurality of electrochemical cells provided within a housing. The battery system also includes a thermal management system configured to provide at least one of heating or cooling to the electrochemical cells. The thermal management system includes a solid state coating having a first metal and a second metal different from the first metal. The solid state coating is configured to pass a current therethrough to create a temperature differential across a first surface of the solid state coating and a second surface of the solid state coating to provide the at least one of heating or cooling to the cells.

According to another exemplary embodiment, a method of providing thermal management to a battery system uses a thermal management system having a solid state coating having a first metal and a second metal different from the first metal, with the solid state coating configured to pass a current therethrough to create a temperature differential across a first surface of the solid state coating and a second surface of the solid state coating to provide at least one of heating and cooling to the cells. The method includes determining a temperature of at least one of a plurality of electrochemical cells. The method also includes determining whether heating of the plurality of electrochemical cells is required based on the temperature of the at least one cell and applying a current in a first direction to the solid state coating to heat the plurality of electrochemical cells if heating is required. The method further includes charging the electrochemical cells. The method yet further includes determining whether cooling of the plurality of electrochemical cells is required based on the temperature of the at least one cell and applying a current in a second direction to the solid state coating to cool the plurality of electrochemical cells if cooling is required.

According to an exemplary embodiment, a battery system includes an electrochemical cell and a thermal management system that utilizes a peltier effect to heat or cool the electrochemical cell.

DETAILED DESCRIPTION

Figure 1:
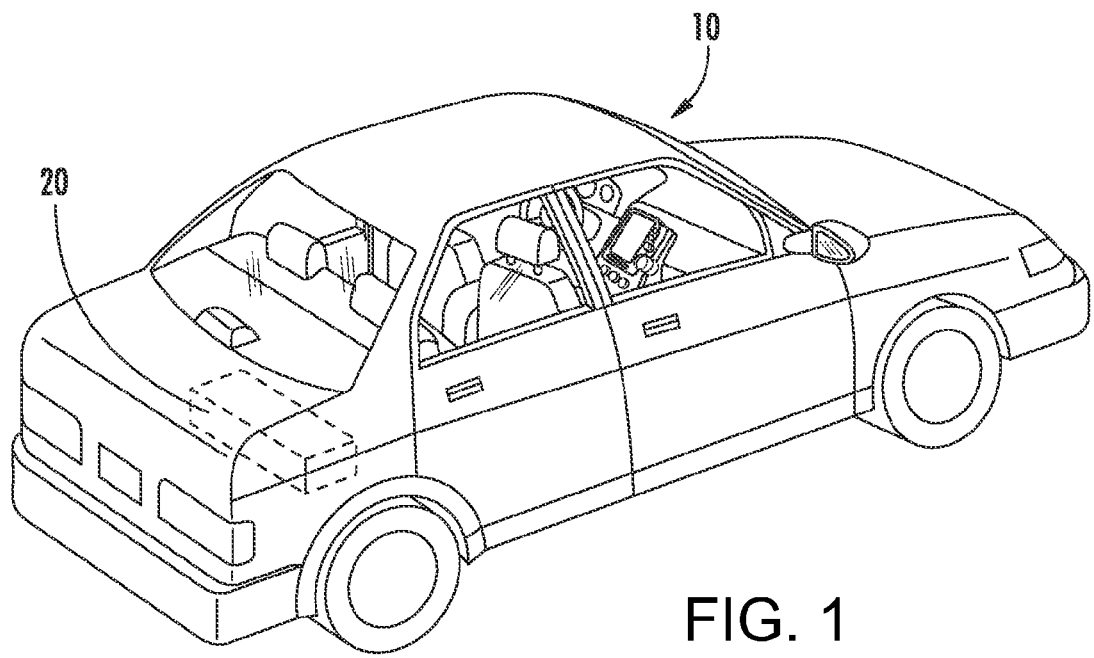
FIG. 1 is a perspective view of a vehicle including a battery system according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents, cooling devices, etc.), and a variety of other considerations.

Figure 2:
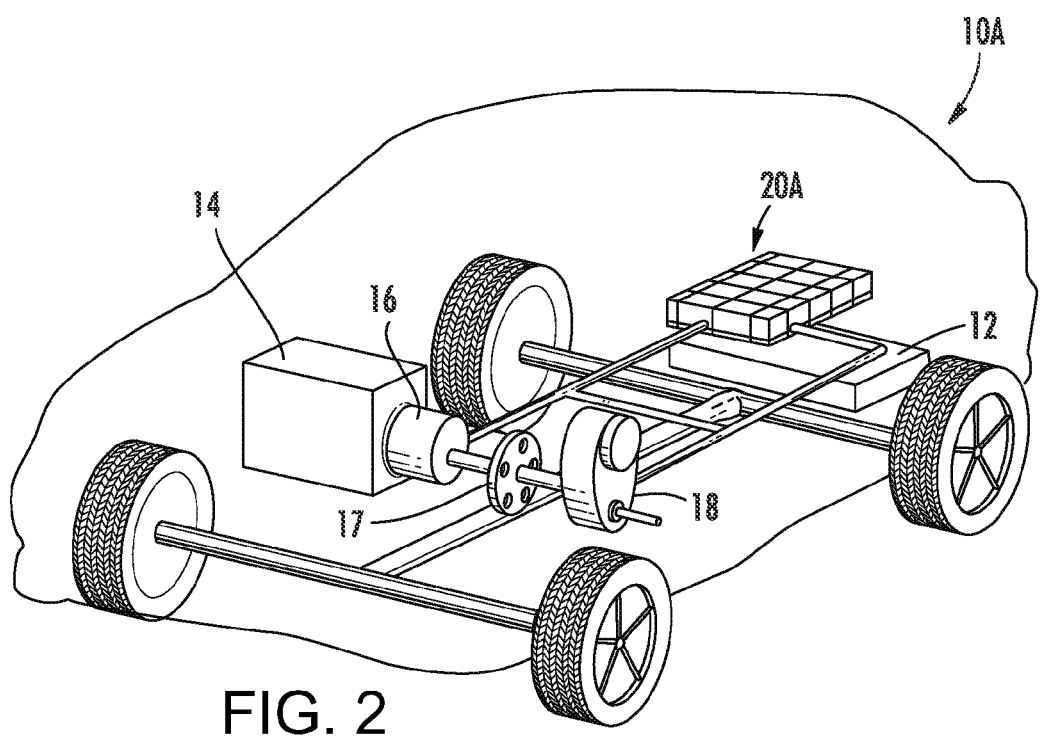
FIG. 2 is a cutaway schematic view of a vehicle including a battery system according to another exemplary embodiment.

FIG. 2 illustrates a cutaway schematic view of a vehicle 10A provided in the form of an HEV according to an exemplary embodiment. A battery system 20A is provided toward the rear of the vehicle 10A proximate a fuel tank 12 (the battery system 20A may be provided immediately adjacent the fuel tank 12 or may be provided in a separate compartment in the rear of the vehicle 10A (e.g., a trunk) or may be provided elsewhere in the vehicle 10A). An internal combustion engine 14 is provided for times when the vehicle 10A utilizes gasoline power to propel the vehicle 10A. An electric motor 16, a power split device 17, and a generator 18 are also provided as part of the vehicle drive system.

Such a vehicle 10A may be powered or driven by just the battery system 20A, by just the engine 14, or by both the battery system 20A and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery systems 20, 20A, the type of vehicles 10, 10A, the type of vehicle technology (e.g., EV, HEV, PHEV, etc.), and the battery chemistry, among other features, may differ from those shown or described.

Figure 3:
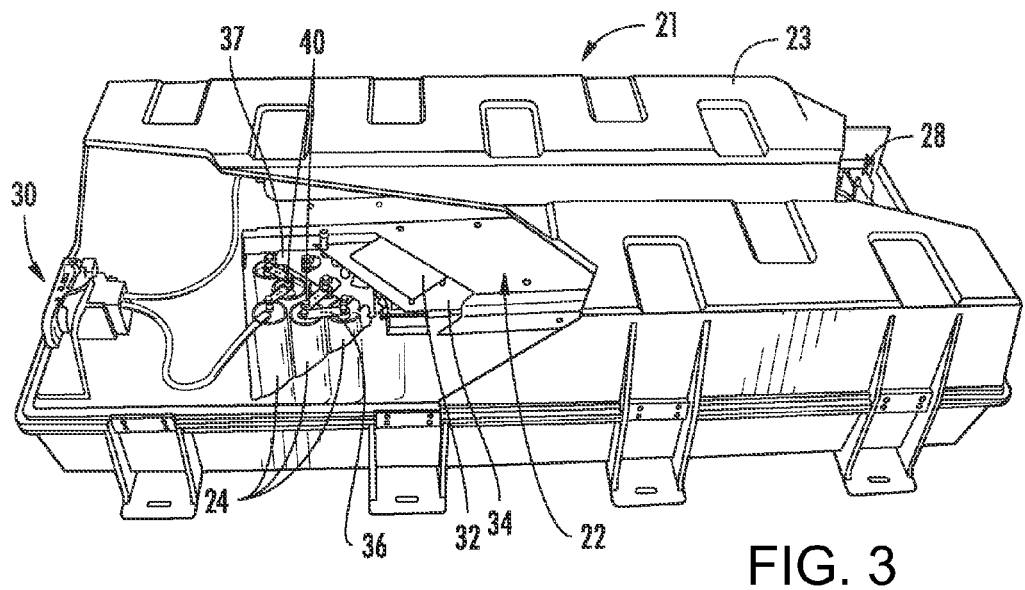
FIGS. 3-4 are partial cutaway views of a battery system for use in a vehicle according to an exemplary embodiment.
Figure 4:
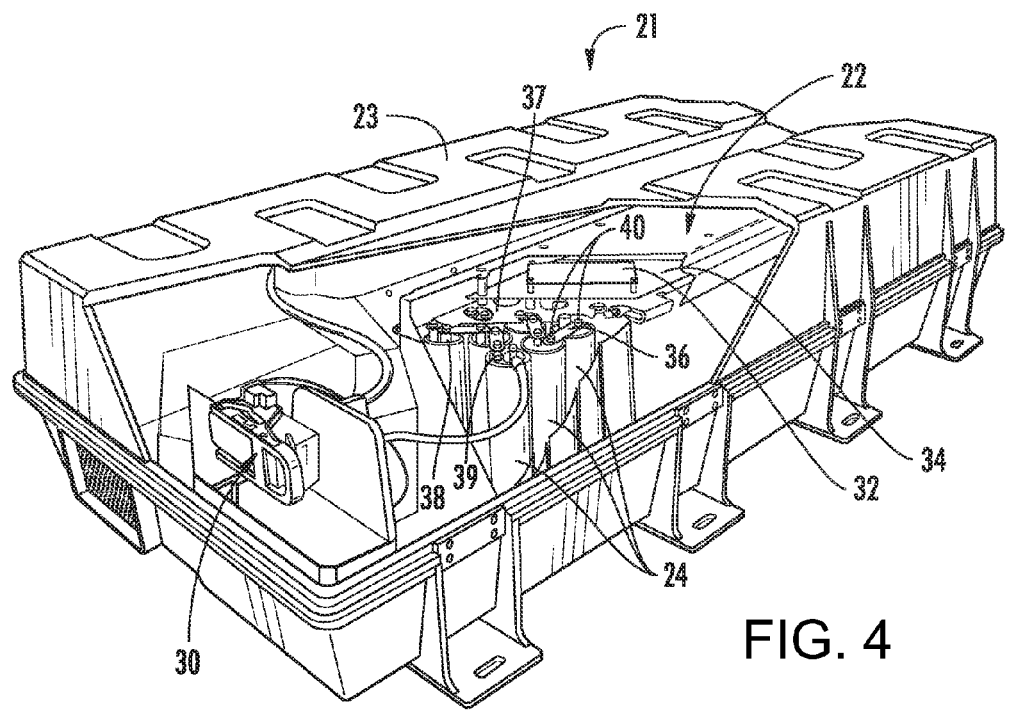

Referring now to FIGS. 3-4, partial cutaway views of a battery system 21 are shown according to an exemplary embodiment. According to an exemplary embodiment, the battery system 21 is responsible for packaging or containing electrochemical batteries or cells 24, connecting the electrochemical cells 24 to each other and/or to other components of the vehicle electrical system, and regulating the electrochemical cells 24 and other features of the battery system 21. For example, the battery system 21 may include features that are responsible for monitoring and controlling the electrical performance of the battery system 21, managing the thermal behavior of the battery system 21, containing and/or routing of effluent (e.g., gases that may be vented from a cell 24), and other aspects of the battery system 21.

According to the exemplary embodiment as shown in FIGS. 3-4, the battery system 21 includes a cover or housing 23 that encloses the components of the battery system 21. Included in the battery system are two battery modules 22 located side-by-side inside the housing 23. According to other exemplary embodiments, a different number of battery modules 22 may be included in the battery system 21, depending on the desired power and other characteristics of the battery system 21. According to other exemplary embodiments, the battery modules 22 may be located in a configuration other than side-by-side (e.g., end-to-end, etc.).

As shown in FIGS. 3-4, the battery system 21 also includes a high voltage connector 28 located at one end of the battery system 21 and a service disconnect 30 located at a second end of the battery system 21 opposite the first end according to an exemplary embodiment. The high voltage connector 28 connects the battery system 21 to a vehicle 10. The service disconnect 30, when actuated by a user, disconnects the two individual battery modules 22 from one another, thus lowering the overall voltage potential of the battery system 21 by half to allow the user to service the battery system 21.

According to an exemplary embodiment, each battery module 22 includes a plurality of cell supervisory controllers (CSCs) 32 to monitor and regulate the electrochemical cells 24 as needed. According to other various exemplary embodiments, the number of CSCs 32 may differ. The CSCs 32 are mounted on a member shown as a trace board 34 (e.g., a printed circuit board). The trace board 34 includes the necessary wiring to connect the CSCs 32 to the individual electrochemical cells 24 and to connect the CSCs 32 to a battery management system (not shown) of the battery system 21. The trace board 34 also includes various connectors to make these connections possible (e.g., temperature connectors, electrical connectors, voltage connectors, etc.).

Still referring to FIGS. 3-4, each of the battery modules 22 includes a plurality of electrochemical cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the electrochemical cells 24 could have other physical configurations (e.g., oval, prismatic, polygonal, etc.). The capacity, size, design, and other features of the electrochemical cells 24 may also differ from those shown according to other exemplary embodiments.

Each of the electrochemical cells 24 is electrically coupled to one or more other electrochemical cells 24 or other components of the battery system 21 using connectors provided in the form of bus bars 36 or similar elements. According to an exemplary embodiment, the bus bars 36 are housed or contained in bus bar holders 37. According to an exemplary embodiment, the bus bars 36 are constructed from a conductive material such as copper (or copper alloy), aluminum (or aluminum alloy), or other suitable material. According to an exemplary embodiment, the bus bars 36 may be coupled to terminals 38, 39 of the electrochemical cells 24 by welding (e.g., resistance welding) or through the use of fasteners 40 (e.g., a bolt or screw may be received in a hole at an end of the bus bar 36 and screwed into a threaded hole in one of the terminals 38, 39).

Referring now to FIGS. 5-8, several thermal management systems for battery systems are shown according to various exemplary embodiments. The various thermal management systems are configured to cool and/or warm the individual cells located in the one or more battery modules of the battery system. The thermal management systems are designed to bring a cooling and/or warming gas or fluid (e.g., air) into the battery system in the event that a control system (e.g., a battery management system) determines that individual cells within the battery system need cooling and/or warming.

According to an exemplary embodiment, each thermal management system may include a housing located around the one or more battery modules of the battery system. The thermal management system may also include ductwork leading into and/or out of the housing. The ductwork may be made from an appropriate material, such as metal (e.g., sheet metal) or plastic (e.g., polyethylene, polypropylene, PVC, etc.). The thermal management system may further include one or more control valves located within the ductwork leading into and/or out of the housing.

According to one exemplary embodiment, the cooling/warming fluid (e.g., the thermal management fluid) that is brought into the housing (e.g., by inlet ductwork) flows around the cells of the battery module. According to another exemplary embodiment, the cooling/warming fluid flows in between and among the cells of the battery module. According to these embodiments, the battery module may or may not include its own housing surrounding the cells.

According to another exemplary embodiment, the cooling/warming fluid is provided external to a housing of the battery module that contains the cells. For example, the inlet ductwork directs the cooling/warming fluid to the housing that contains the cells, and, instead of entering the housing, the cooling/warming fluid flows directly under, alongside, and/or over the housing. In this way, the cooling/warming fluid of the thermal management system is completely separate (i.e., external) from the cells (and the housing) of the battery module.

Having the cooling/warming fluid external to the housing of the battery module allows for proper thermal management of the system (i.e., the cells), but also isolates the cooling/warming fluid from any gases and/or electrolyte that may be vented from the cells within the system. Hence, in the case of cell venting, the vehicle cabin air is not mixing with the vented gas and/or electrolyte. Additionally, in the case of a liquid cooling/warming fluid (e.g., water, water/glycol mixture), the failure mode of liquid leaking into the battery chamber and high voltage areas is eliminated.

Figure 5:
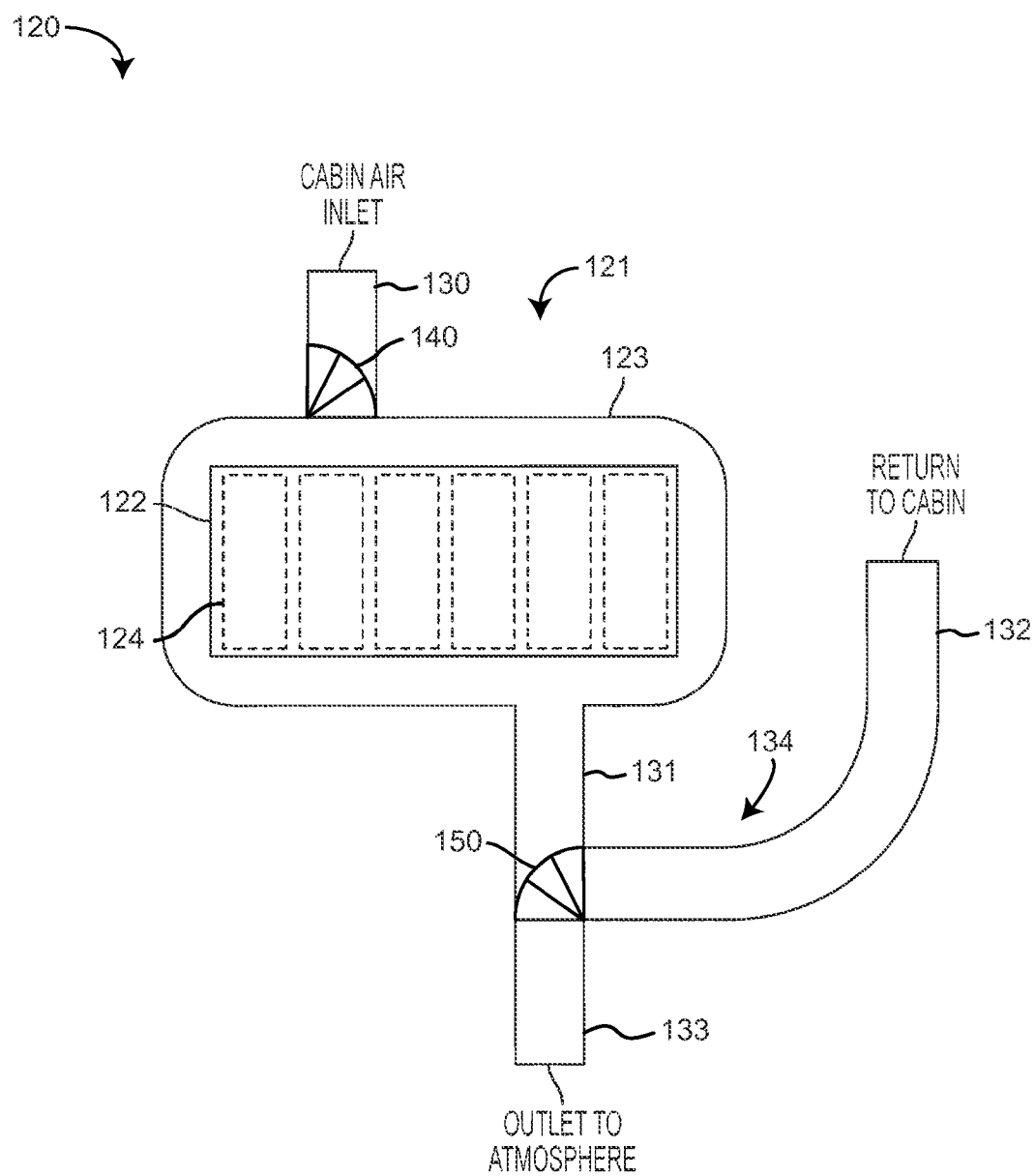
FIGS. 5-8 are schematic diagrams of a battery system having a thermal management system according to various exemplary embodiments.

Referring to FIG. 5, a thermal management system 121 is shown according to an exemplary embodiment. The thermal management system 121 is configured to utilize air from inside a cabin of a vehicle (e.g., vehicle 10, 10A) to either heat or cool a battery system 120, depending on the temperature of the air inside the cabin. The thermal management system 121 may be an open or closed system. For example, air may enter the battery housing 123 from ductwork or tubing (e.g., inlet ductwork 130) connected to the cabin to heat or cool the battery system 120, and then be routed back to the cabin (closed system) or outside of the vehicle (open system) through additional ductwork (e.g., outlet ductwork 134). According to an exemplary embodiment, outlet ductwork 134 includes a first portion 131 in fluid communication with the housing 123, a second portion 132 in fluid communication with the first portion 131, and a third portion 133 also in fluid communication with the first portion 131.

According to an exemplary embodiment, a control valve (e.g., an inlet valve 140) is located in the ductwork 130 between the cabin and the inlet to the battery system. The inlet valve 140 opens or closes as needed to supply the heating or cooling air. According to an exemplary embodiment, the inlet valve 140 is controlled by a control system (e.g., BMS). According to another exemplary embodiment, the valve may be constructed from an automatic shape memory alloy, such as shown and described in U.S. Pat. No. 4,976,327, the entire disclosure of which is incorporated herein by reference. The automatic shape memory alloy valve opens or closes depending on the temperature of the fluid (e.g., air) around it, automatically opening or closing as designed to meet the cooling/heating requirements of the battery system 120.

According to another exemplary embodiment, a control valve (e.g., outlet valve 150) may be provided in the outlet ductwork 134. The outlet valve 150 serves to direct the heating or cooling air back to the cabin of the vehicle or to the atmosphere outside of the vehicle, depending on the temperature of the exiting heating or cooling air. For example, in the case of air from the cabin being used to cool the battery system 120, if the air exiting the battery system 120 is cooler than the temperature of the air outside of the vehicle, the outlet valve 150 directs the cooling air back to the cabin. However, if the air exiting the battery system 120 is warmer than the temperature of the air outside of the vehicle, the outlet valve 150 directs the (now warm) cooling air outside the vehicle. In this way, the air conditioning system for the cabin of the vehicle is cooling only the lower temperature air in order to operate more efficiently.

In the case of air from the cabin being used to heat the battery system 120, if the air exiting the battery system 120 is warmer than the temperature of the air outside of the vehicle, the outlet valve 150 directs the cooling air back to the cabin. However, if the air exiting the battery system 120 is cooler than the temperature of the air outside of the vehicle, the outlet valve 150 directs the (now cool) heating air outside the vehicle. In this way, the heating system for the cabin of the vehicle is heating only the higher temperature air in order to operate more efficiently.

According to an exemplary embodiment, the outlet valve 150 is configured to route the heating or cooling air into the atmosphere, instead of returning the heating or cooling fluid back to the cabin, regardless of the temperature of the heating or cooling fluid, if a certain condition of the battery system 120 is detected. One such condition of the battery system 120 is when gases from inside the individual cells have been released (e.g., a venting condition). A venting condition may lead to gases being released into the path of the heating or cooling air.

According to an exemplary embodiment, the outlet valve 150 may be configured to stay in this position (routing to atmosphere) until the battery system 120 is serviced. According to another exemplary embodiment, the outlet valve 150 may resume directing the heating or cooling air in the most efficient manner after a period of delay (e.g., two seconds, two minutes, etc.) in order for the gases released during the venting condition to exit the battery system 120 and the vehicle.

According to an exemplary embodiment, the opening and/or closing of the outlet valve 150 may be based on an actual venting condition using sensors to determine whether a venting condition has occurred (e.g., using pressure sensors, electrolyte sensors, etc.). According to another exemplary embodiment, the opening and/or closing of the outlet valve 150 may be based upon other conditions that typically indicate a likely venting condition (e.g., if cell temperature and state of charge are increasing).

Figure 6:
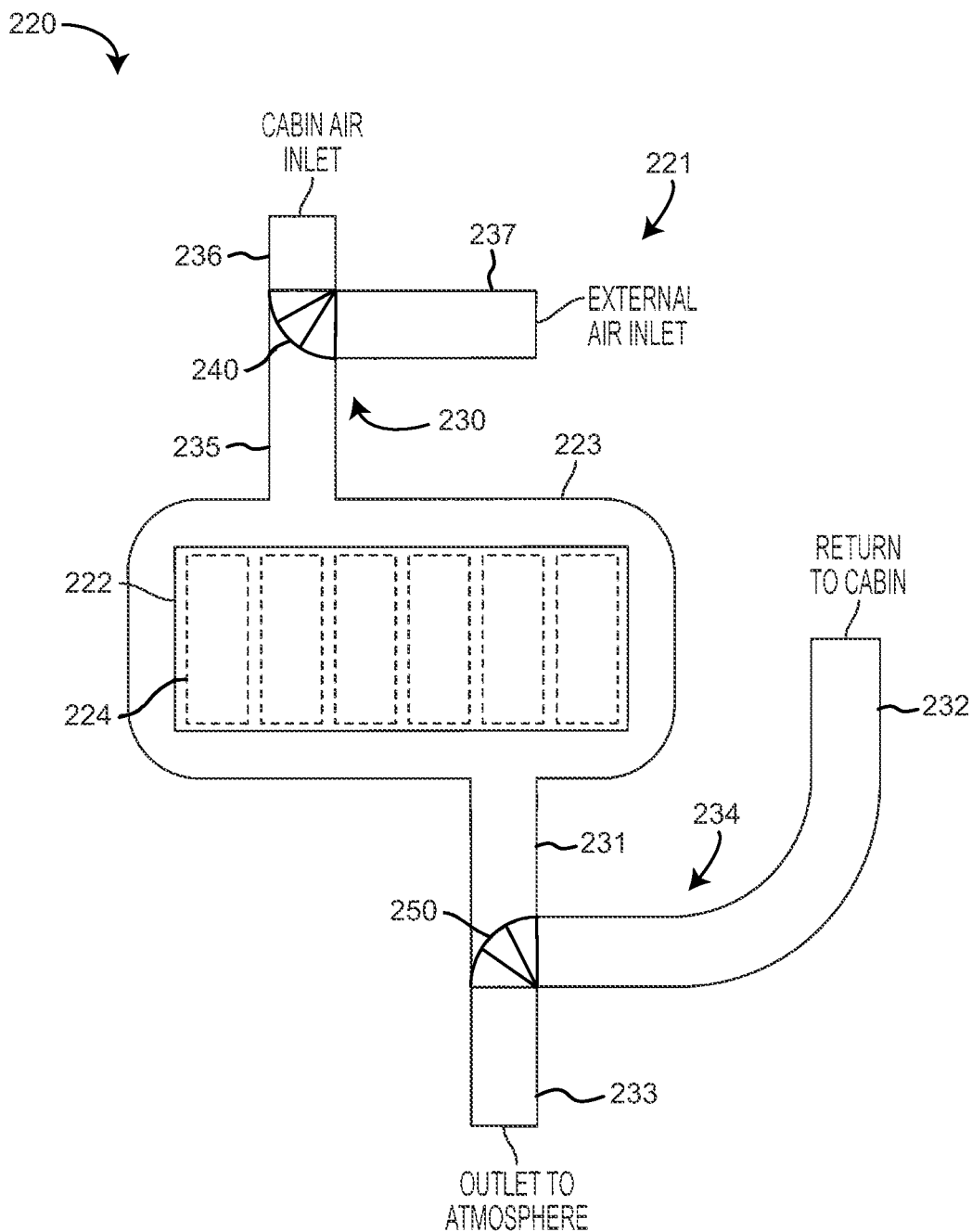
Figure 7:
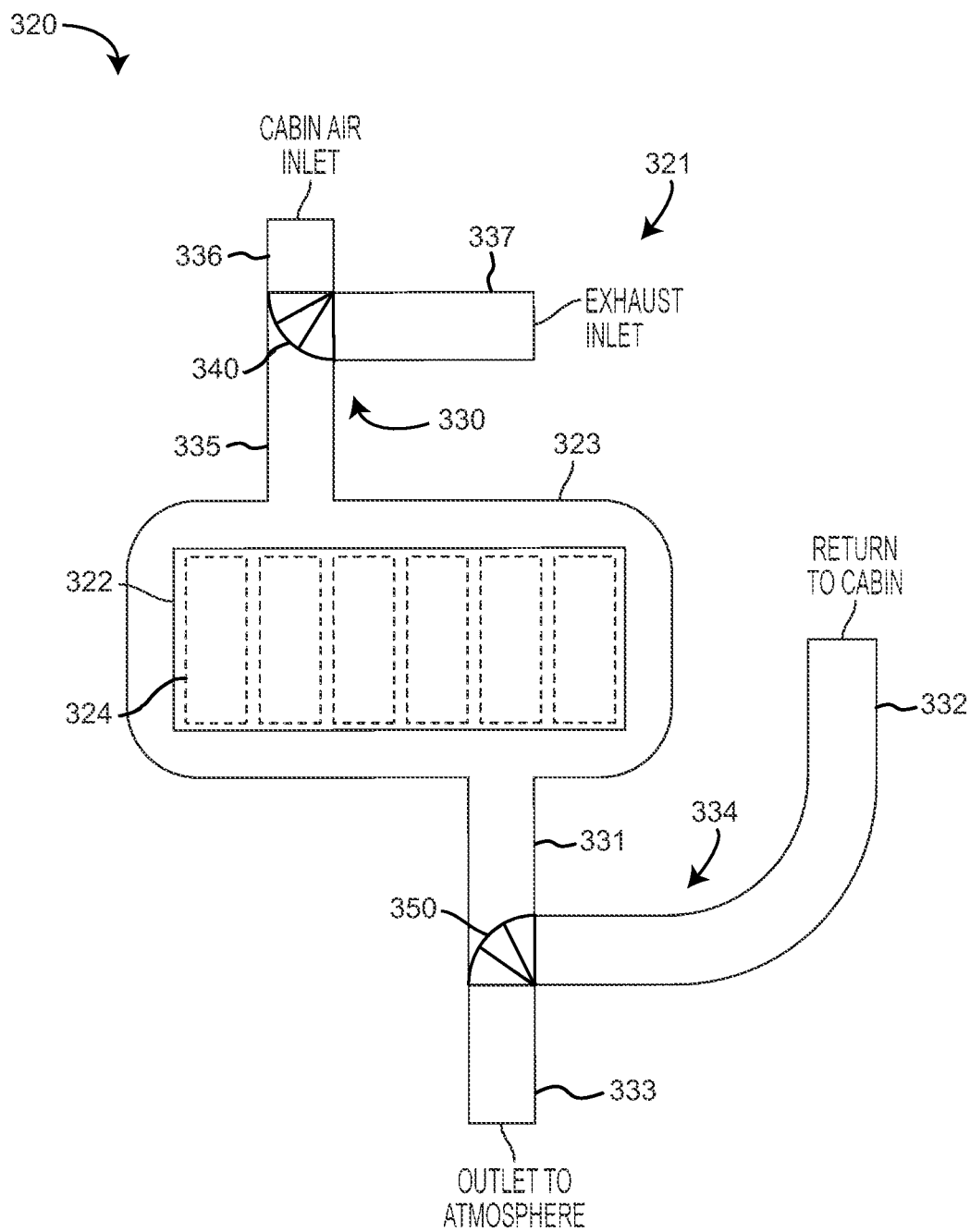

Referring now to FIG. 6, a thermal management system 231 for a battery system 220 is shown according to another exemplary embodiment. The thermal management system 231 includes inlet ductwork 230 that is configured to receive a heating and/or cooling fluid (e.g., air) from two sources (i.e., a dual source inlet). According to one exemplary embodiment, the two sources may include air from the cabin of a vehicle and air from outside of the vehicle. According to another exemplary embodiment, the air may be from a different source (e.g., such as from the exhaust of a vehicle, as shown in FIG. 7). As shown in FIG. 6, according to an exemplary embodiment, inlet ductwork 230 includes a first portion 235 in fluid communication with the housing 223, a second portion 236 in fluid communication with the first portion 235 and the cabin air inlet, and a third portion 237 in fluid communication with the first portion 235 and the external air inlet.

According to an exemplary embodiment, the thermal management system 231 supplies heating and/or cooling air to cells 224 of a battery system 220 as needed. According to one exemplary embodiment, if the battery system 220 requires cooling and the air inside the cabin of the vehicle is cooler than the air outside of the vehicle, a control valve (e.g., inlet valve 240) is positioned so that the cool air from the cabin enters the housing 223 of the battery system 220 to cool the cells 224 of the battery module 222. On the other hand, if the air outside of the vehicle is cooler than the air inside of the cabin (e.g., after the car has been sitting in the hot sun so that the temperature inside of the car is hotter than the temperature outside of the car), the inlet valve 240 is positioned so that the cooler external air enters the battery system 220 in order to cool the cells 224. The inlet valve 240 may then change position once the air inside the cabin is cooler than the air outside of the vehicle.

According to an exemplary embodiment, the thermal management system also includes a control valve (e.g., outlet valve 250) in the outlet ductwork 234 that is configured to route the cooling or heating air back to the cabin or to the external environment outside of the vehicle. The outlet valve 250 may operate similar to the outlet valve as shown in FIG. 5 and described above.

Referring now to FIG. 7, a thermal management system 321 for a battery system 320 is shown according to another exemplary embodiment. The thermal management system 321 includes inlet ductwork 330 that is configured to receive a heating and/or cooling fluid (e.g., air) from two sources (i.e., a dual source inlet), similar to the ductwork 230 shown in FIG. 6. According to this exemplary embodiment, the first source of the heating and/or cooling fluid is from the cabin of a vehicle, and the second source of the heating fluid is from the exhaust of the vehicle. The second source of the heating fluid may be directly connected to the exhaust of a vehicle or may be air that is warmed by the exhaust, for example, by a heat exchanger, but does not include actual exhaust. For the embodiment directly connected to the exhaust of the vehicle, an outlet valve 350 (e.g., as shown in FIG. 7) is positioned in the outlet ductwork 334 such that the exhaust air is directed to atmosphere (and not to the cabin of the vehicle).

According to an exemplary embodiment, the thermal management system 321 includes a control valve (e.g., an inlet valve 340) similar to the inlet valve 240 shown in FIG. 6. The inlet valve 340 is designed to allow a heating and/or cooling air to enter the battery system 320 to warm or cool the cells 324 as needed. For example, if the individual cells 324 of the battery module 322 need warming, the inlet valve 340 is positioned to allow warming air from (or warmed by) the exhaust of the vehicle to enter the battery system 320 to warm the cells 324 of the battery module 322. However, if the cells 324 of the battery need to be cooled, the inlet valve 340 is positioned to allow the cooling air from the cabin of the vehicle to enter the battery system 320 to cool the cells 324 of the battery module 322.

The thermal management system 321 also includes outlet ductwork or tubing 334 and may route the warming and/or cooling air to the outside atmosphere or back to the cabin of the vehicle. The outlet ductwork 334 may include an outlet valve 350, with the outlet ductwork 334 and outlet valve 350 being similar to those shown in FIGS. 5 and 6 and described above.

Figure 8:
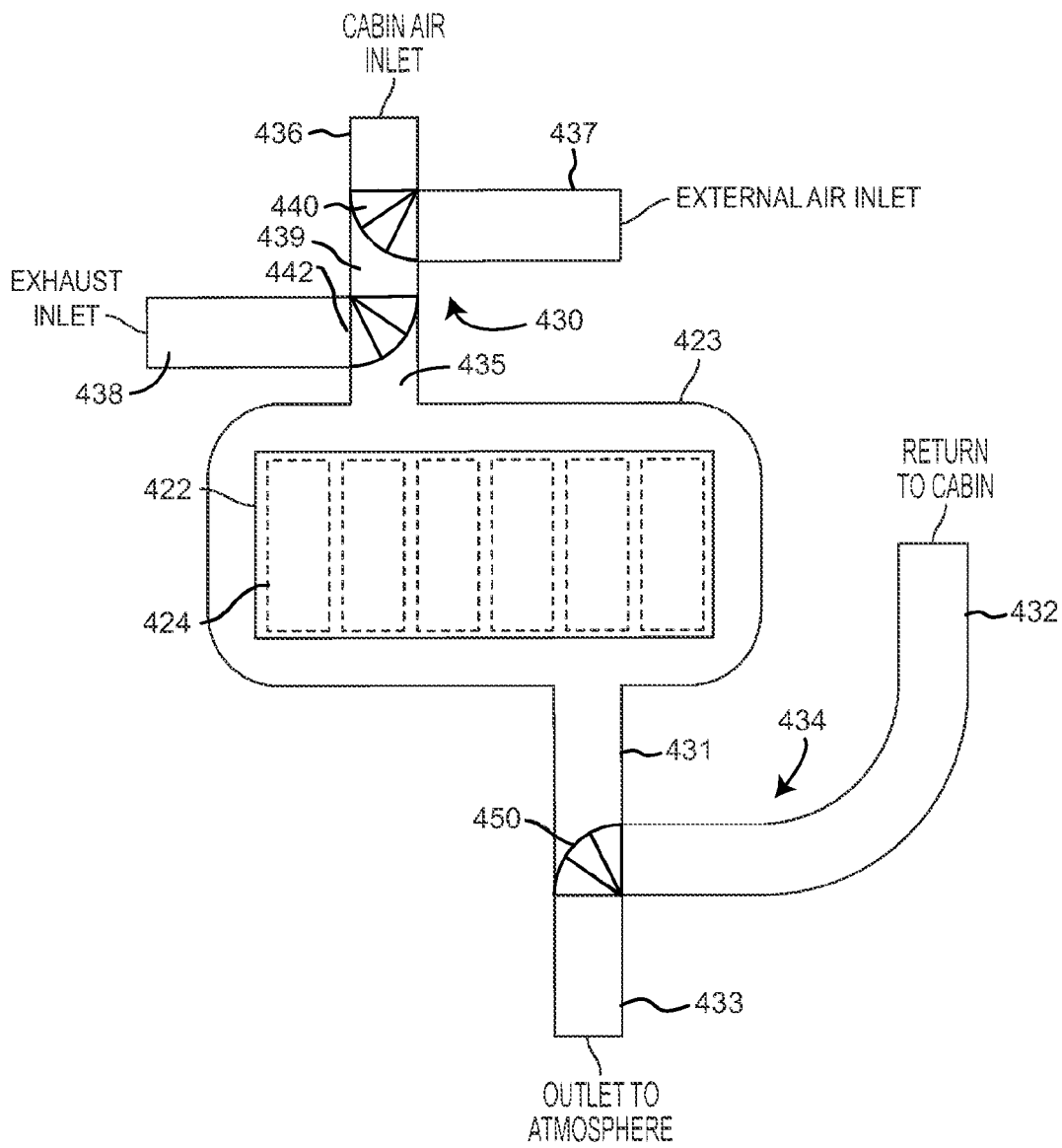

Referring now to FIG. 8, a thermal management system 321 for a battery system 420 is shown according to another exemplary embodiment. The thermal management system includes inlet ductwork 430 that is configured to receive a heating and/or cooling fluid (e.g., air) from three separate sources for heating and/or cooling of the battery system. According to an exemplary embodiment, the first source is air from the cabin of a vehicle, the second source is air from outside of the vehicle, and the third source is exhaust air from the vehicle (or air that is warmed by the exhaust of the vehicle, e.g., by a heat exchanger). Where the third source is exhaust air from the vehicle, an outlet valve 450 (e.g., as shown in FIG. 8) is positioned in the outlet ductwork 434 such that the exhaust air is directed to atmosphere (and not to the cabin of the vehicle).

As shown in FIG. 8, according to an exemplary embodiment, inlet ductwork 430 includes a first portion 435 in fluid communication with the housing 423, a second portion 436 in fluid communication with the first portion 435 and the cabin air inlet, a third portion 437 in fluid communication with the first portion 435 and the exhaust inlet, and a fourth portion 438 in fluid communication with the first portion 435 and the external air inlet. According to the exemplary embodiment shown in FIG. 8, a fifth or intermediate portion 439 is provided between and in fluid communication with first portion 435 and second portion 436.

According to an exemplary embodiment, at least one control valve (e.g., inlet valve 440, 442) is used to direct the flow of the cooling and/or heating fluid. According to the exemplary embodiment shown in FIG. 8, two inlet valves 440, 442 are shown. The first inlet valve 440 is located between a cabin air inlet and an external air inlet. The second inlet valve 442 is located between (i.e., downstream of) the cabin/external air inlets and an exhaust air inlet and controls whether the air from the cabin/external air inlets is directed to the battery module 422 or whether air from the exhaust air inlet is directed to the battery module 422.

The inlet valves may be controlled similarly to the inlet valves shown in FIGS. 5-7 and described above. For example, if the cells 424 of the battery module 422 need to be cooled, the first inlet valve 440 is positioned to provide cool air from either the cabin or outside of the vehicle, depending on which source is cooler. In this scenario, the first inlet valve 440 may change positions depending on the relative temperatures of the cabin air and the outside air in order to supply the coolest air to the battery system 420 for cooling the cells 424. When cooling, the second inlet valve 442 is positioned (e.g., closed) to close off the warming air from the exhaust system. Alternatively, if the cells 424 of the battery module 422 need to be warmed, the second inlet valve 442 is positioned (e.g., opened) to block the cooling air from either the cabin or outside the vehicle and to allow the warming air from the exhaust system to warm the cells 424 of the battery module 422.

The thermal management system 421 also includes outlet ductwork or tubing 434 and may route the warming and/or cooling fluid to the outside atmosphere or back to the cabin of the vehicle. The outlet ductwork or tubing 434 may include an outlet valve 450, with the outlet ductwork 434 and the outlet valve 450 being similar to those shown in FIGS. 5-7 and described above.

Figure 9:
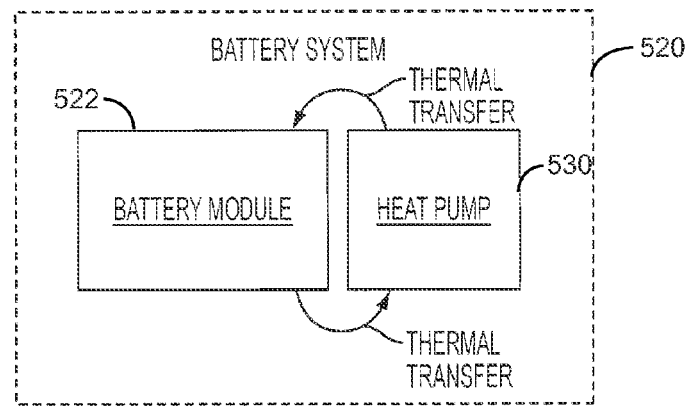
FIGS. 9-11 are schematic diagrams of a battery system having a heat pump according to an exemplary embodiment.
Figure 10:
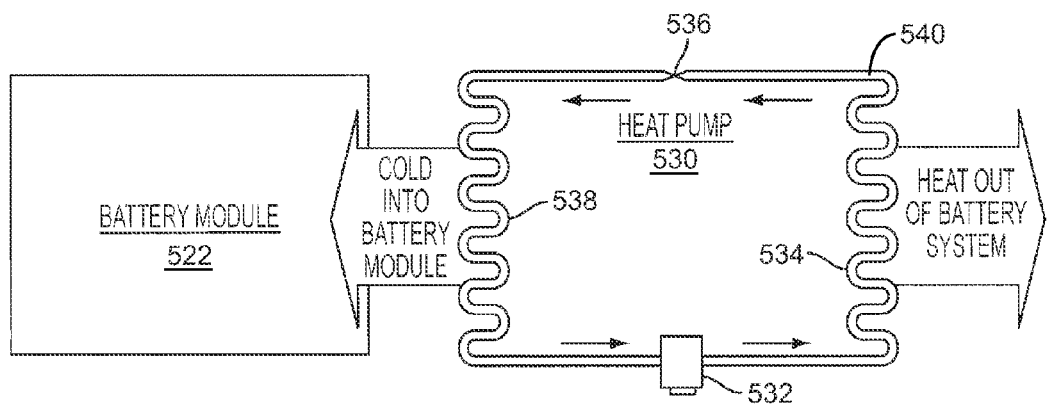
Figure 11:
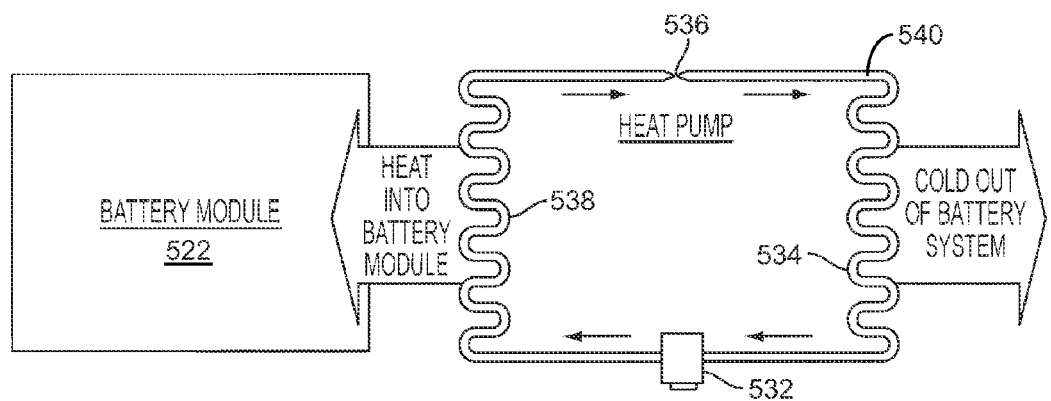

Referring now to FIGS. 9-11, a battery system 520 is shown to include a heat pump 530 (or heat engine) according to an exemplary embodiment. As shown in FIGS. 9-11, the heat pump is directly connected to a battery module 522 and is part of the battery system 520. However, according to other exemplary embodiments, the heat pump 530 may be indirectly connected to the battery module 522 and/or may be located outside of the battery system 520 (e.g., in another portion of the vehicle). The heat pump 530 is configured to heat and/or cool the individual cells (not shown) of the battery module 522, depending on the requirements of the specific application. As such, the thermal transfer takes place between the battery module 522 and the heat pump 530.

Referring now to FIG. 10, the heat pump 530 is shown providing cooling to the battery module 522. The heat pump 530 includes a compressor 532, a condenser 534, an expansion valve 536, and an evaporator 538, all of which are connected by tubing or refrigerant lines 540. The heat pump 530 also comprises a working fluid (e.g., a refrigerant such as R-12, R-134a, etc.) in a gaseous state that is pressurized and circulated through the system by the compressor 532. Upon exiting the compressor 532, the working fluid is now a hot and highly pressurized gas. The working fluid is then cooled in the condenser 534 (e.g., a first heat exchanger), until it condenses into a high pressure, moderate temperature liquid. In the condenser 534, the working fluid is cooled (i.e., rejects heat into the external environment) by, for example, air from outside the vehicle (e.g., when the vehicle is moving) or air from the vehicle air conditioning system.

The condensed working fluid then passes through the expansion valve 536, which lowers the pressure of the working fluid. The low pressure working fluid then enters the evaporator 538 (e.g., a second heat exchanger). In the evaporator 538, the working fluid evaporates into a gas by absorbing heat from the cells of the battery module 522, thus cooling the individual cells of the battery module 522. The working fluid then returns to the compressor 532, and the cycle is repeated.

By reversing the flow of the working fluid inside the heat pump system, the heat pump 530 may provide heat to the battery module 522, as shown in FIG. 11. In this case, the working fluid exits the compressor 532 as a hot and highly pressurized gas, where it enters the condenser 534. In the condenser 534, the working fluid is cooled by rejecting heat into the battery module 522, thus warming the individual cells. After being condensed, the working fluid exits the condenser 534 as a high pressure, moderate temperature liquid. The working fluid then flows through the expansion valve 536, which lowers the pressure of the working fluid. The working fluid then passes through the evaporator 536, where the working fluid absorbs warmth from an external source (e.g., external air, exhaust air, heated cabin air, etc.), and evaporates into a gas. The working fluid then flows to the compressor 532, and the cycle is repeated.

According to an exemplary embodiment, the battery system 520 may be configured with a heat pump 530 that is designed only to cool the battery module 522 (e.g., as shown in FIG. 10) or only to heat the battery module 522 (e.g., as shown in FIG. 11). According to another exemplary embodiment, the heat pump 530 may be configured to both cool and heat the battery module 522, depending on the specific application of the battery system 520. In this case, the flow of the working fluid through the heat pump system 530 may simply be reversed depending on the cooling or heating requirements of the application.

One advantage to having a stand alone heat pump system as shown in FIGS. 9-11 is that the heat pump 530 may be specifically sized for the cooling and/or heating requirements of the battery system 520. In this case, the battery system 520 does not need to depend on external heating and/or cooling sources, such as the air conditioning and/or heating systems of the vehicle to provide heating and/or cooling to the battery module 522. Additionally, packaging a stand alone heat pump 530 within a battery system 520 allows the battery system 520 to be adapted for use (e.g., in a vehicle) without a need for separate cooling and/or heating connections.

Referring now to FIGS. 12A-15, a thermal management system for a battery system is shown according to various exemplary embodiments. The thermal management system may be configured for heating and/or cooling of the cells of the battery module, depending on the requirements of the battery system.

Figure 12A:
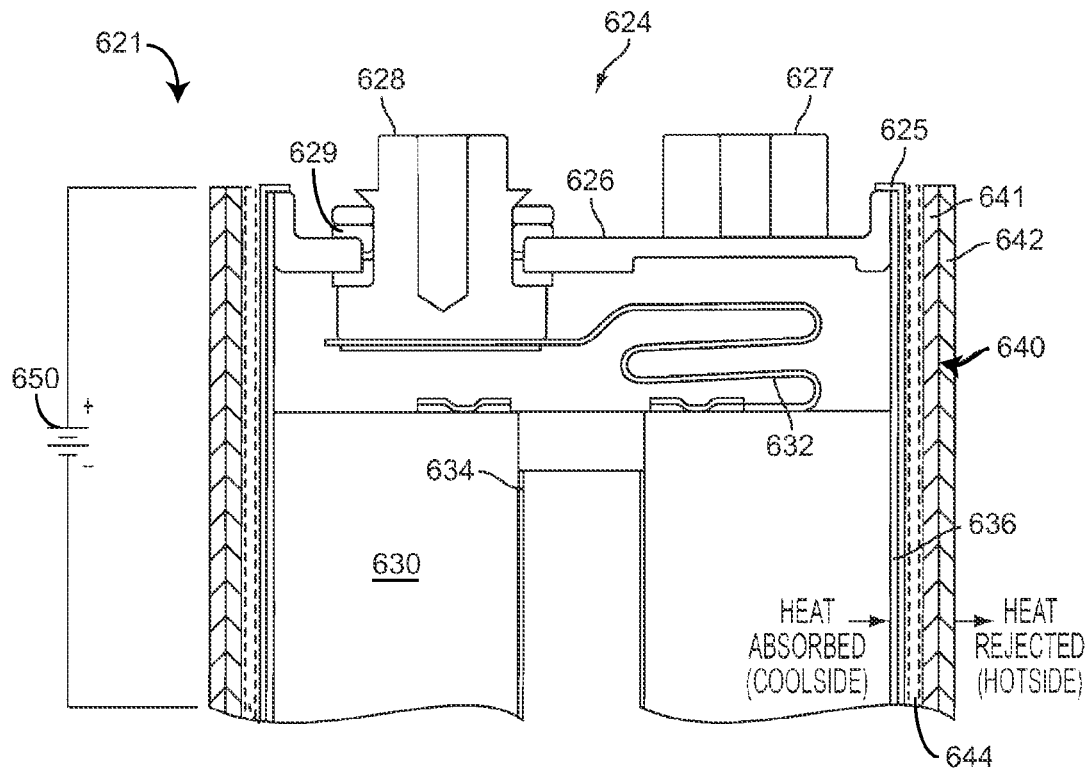
FIG. 12A is a partial cross-section view of an electrochemical cell having a thermal management system according to an exemplary embodiment.
Figure 12B:
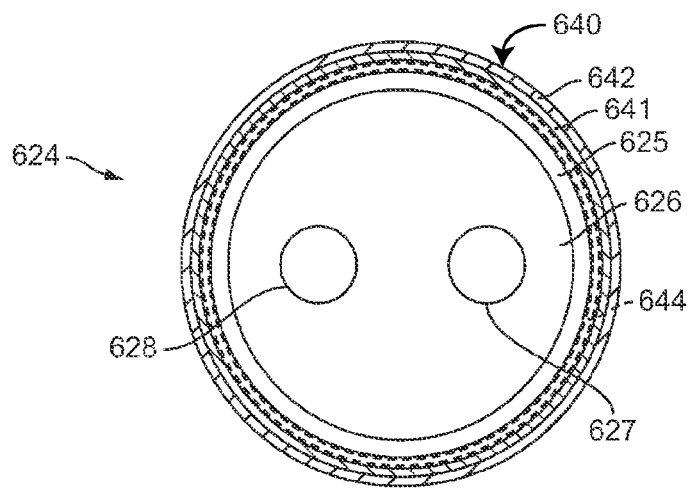
FIG. 12B is a top view of the electrochemical cell of FIG. 12A according to an exemplary embodiment.
Figure 12C:
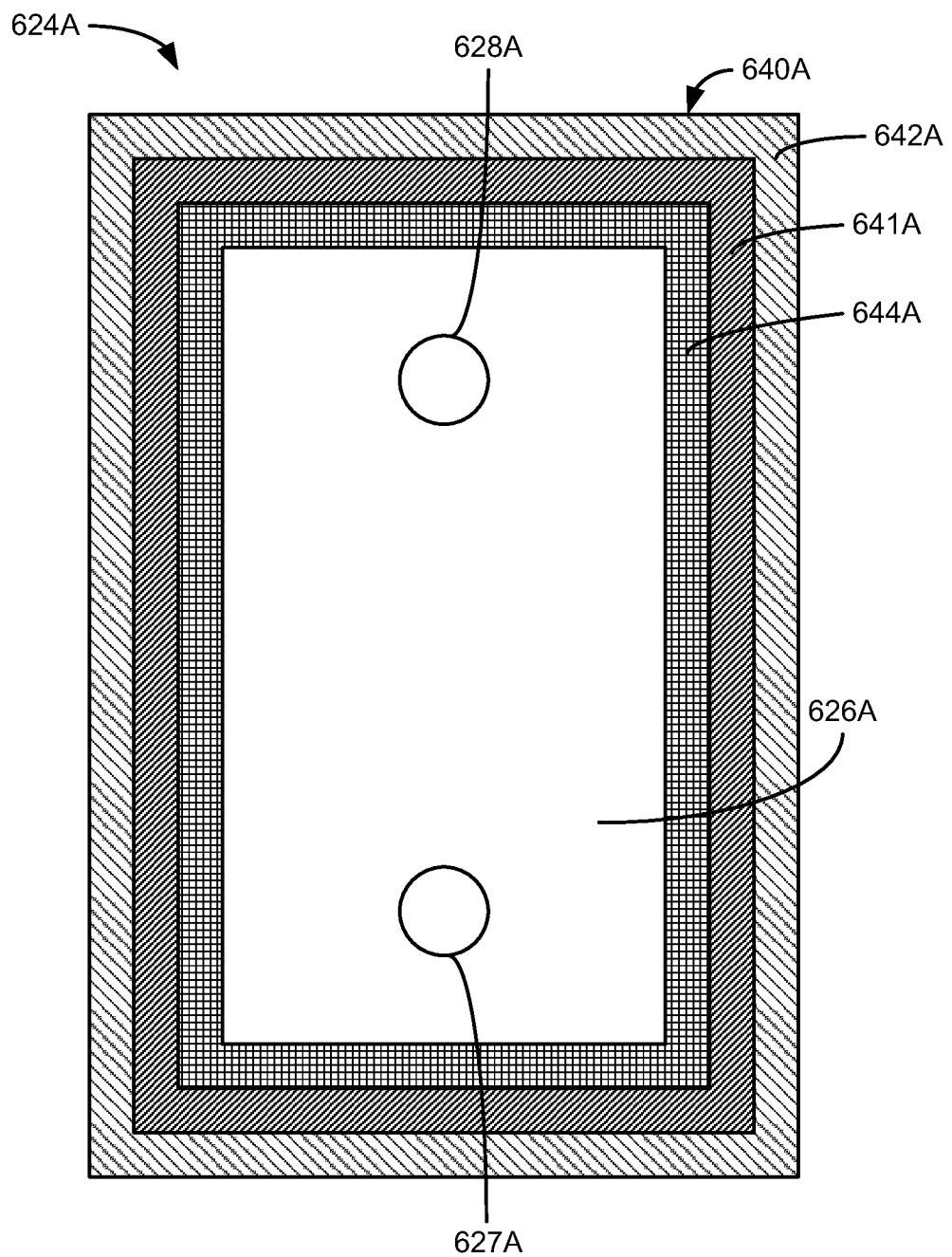
FIG. 12C is a top view of a prismatic electrochemical cell having a thermal management system according to an exemplary embodiment.
Figure 13A:
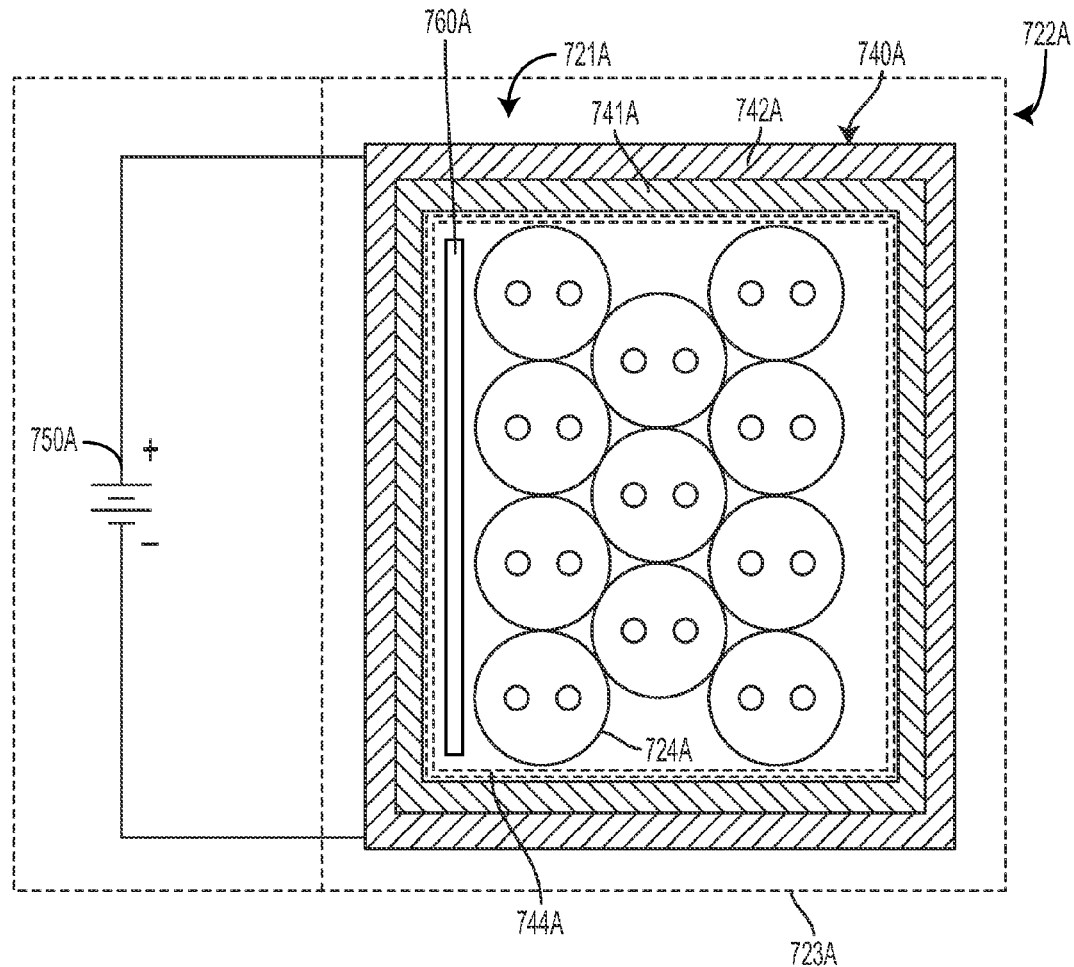
FIGS. 13A-13H are schematic diagrams of a battery system having a thermal management system according to various exemplary embodiments.
Figure 13B:
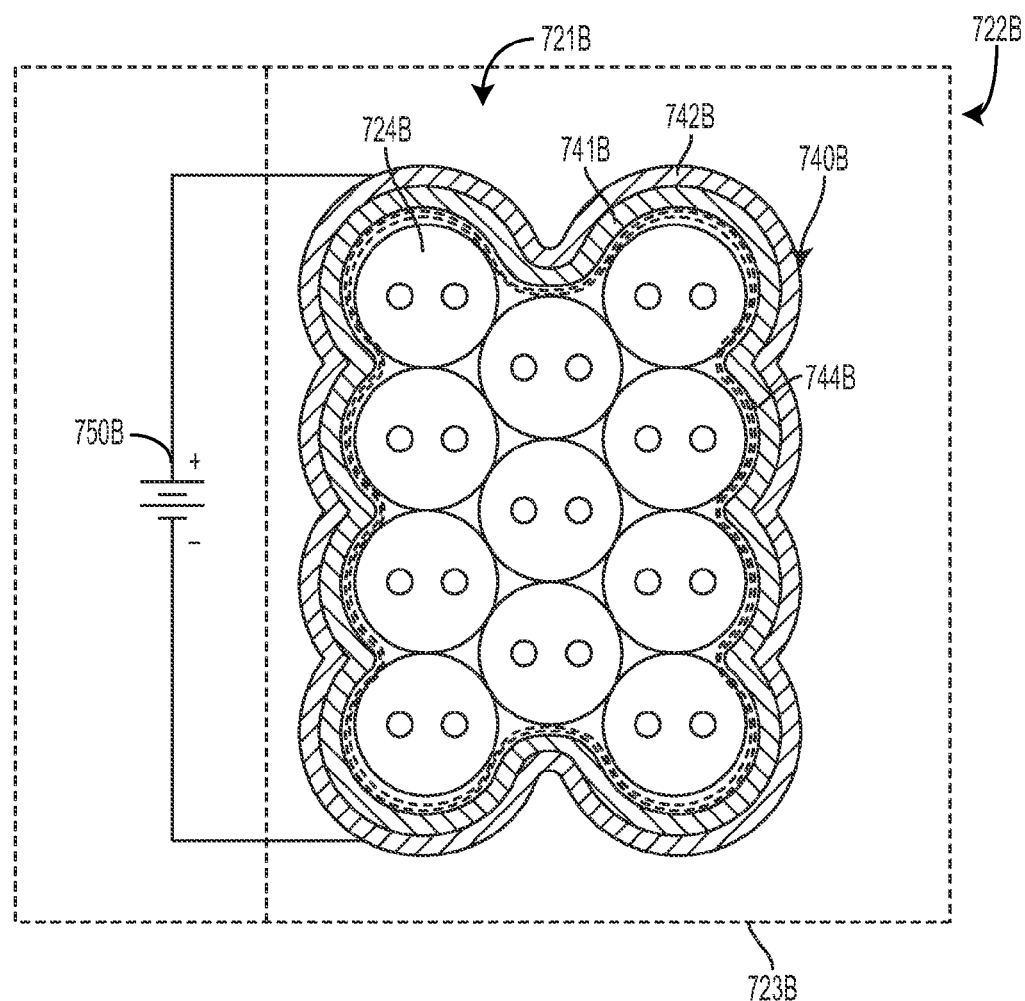
Figure 13C:
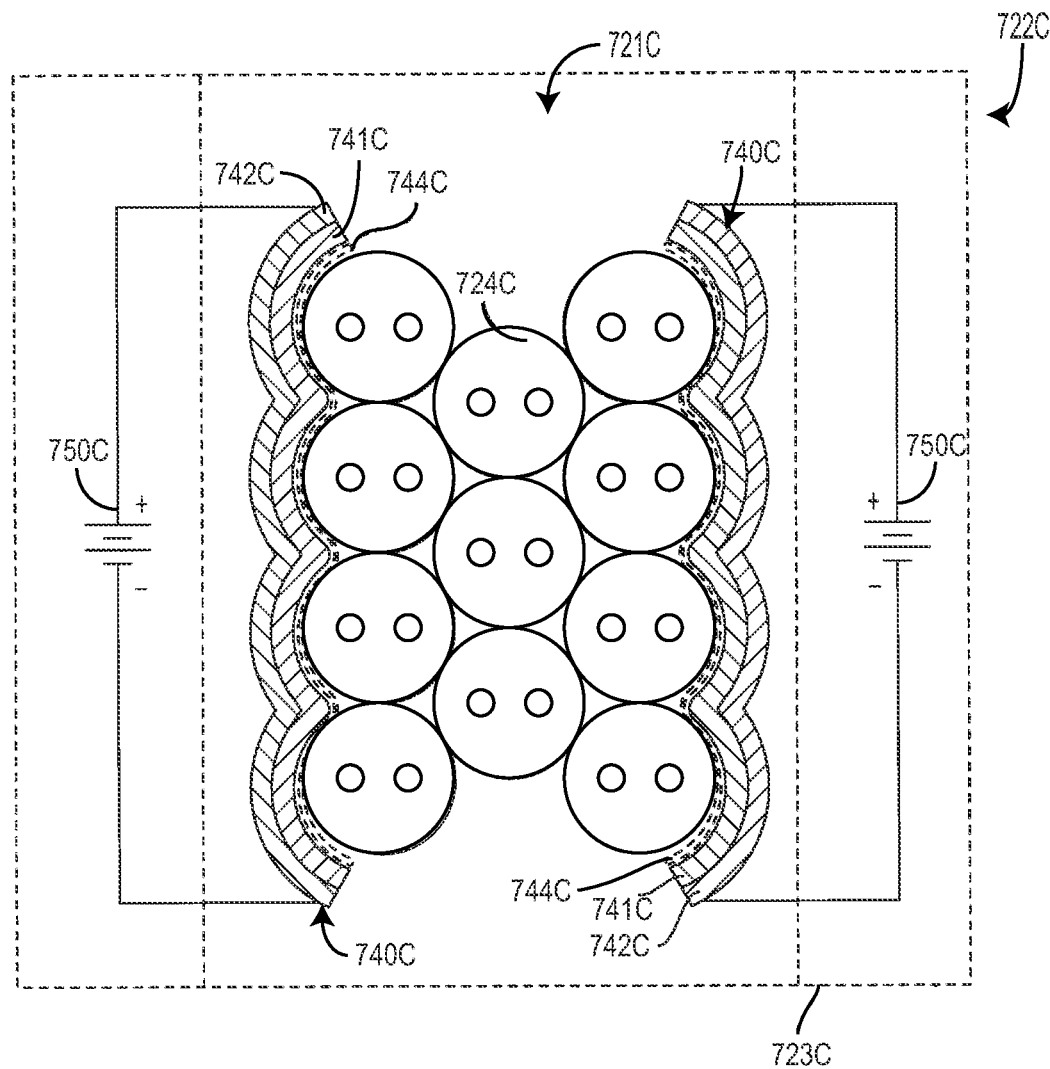
Figure 13D:
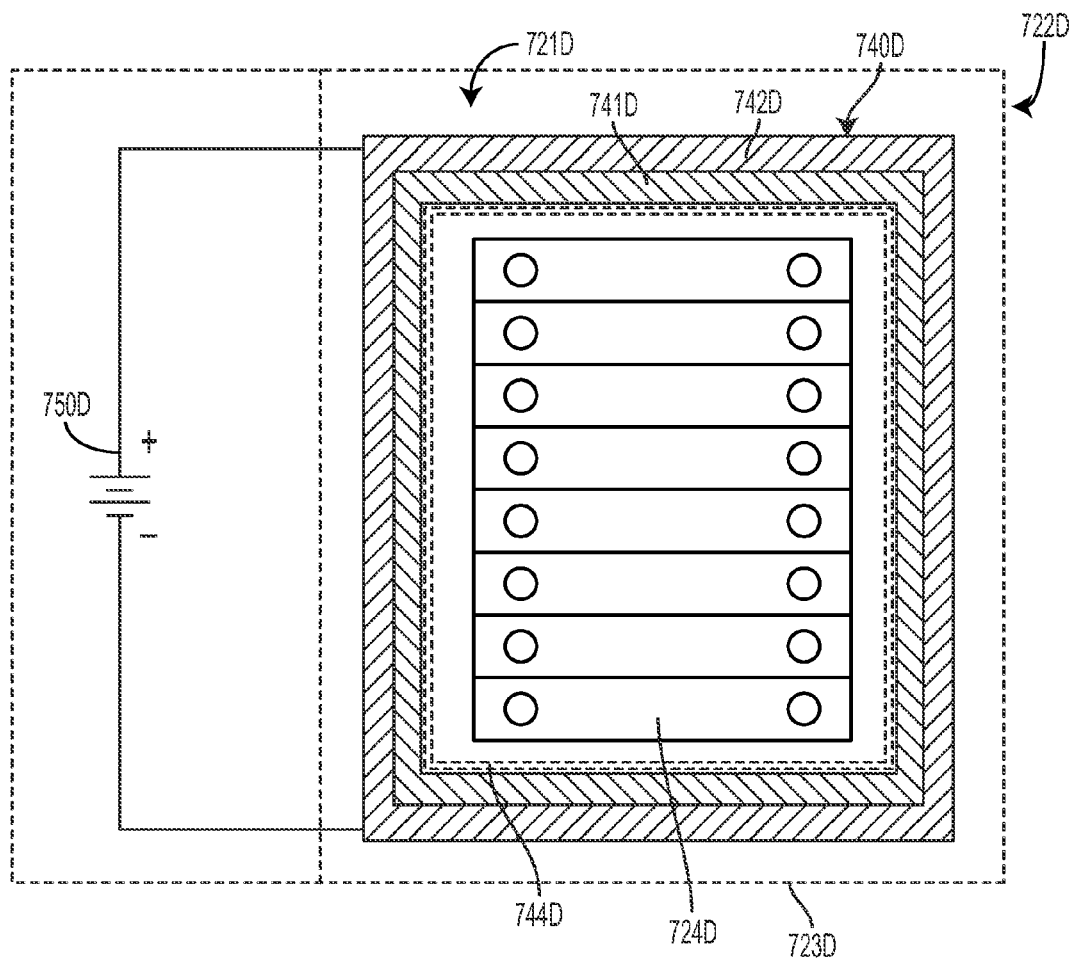
Figure 13E:
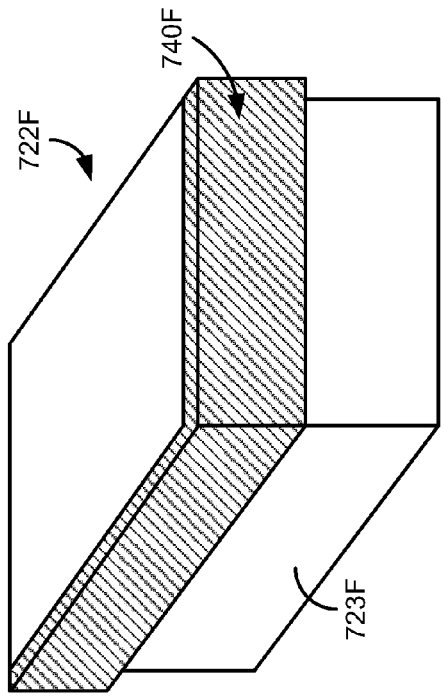
Figure 13F:
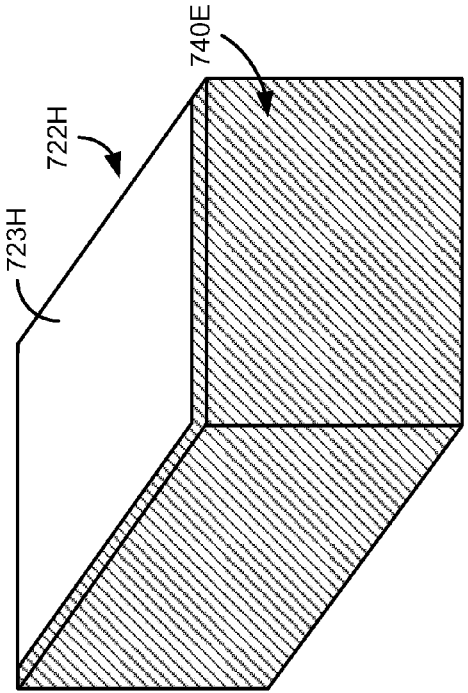
Figure 13G:
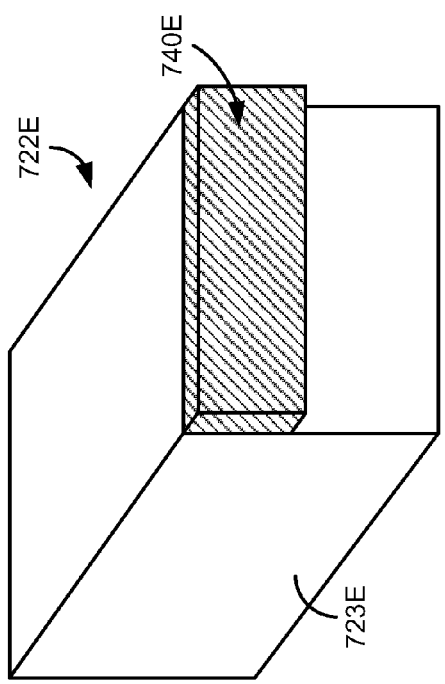
Figure 13H:
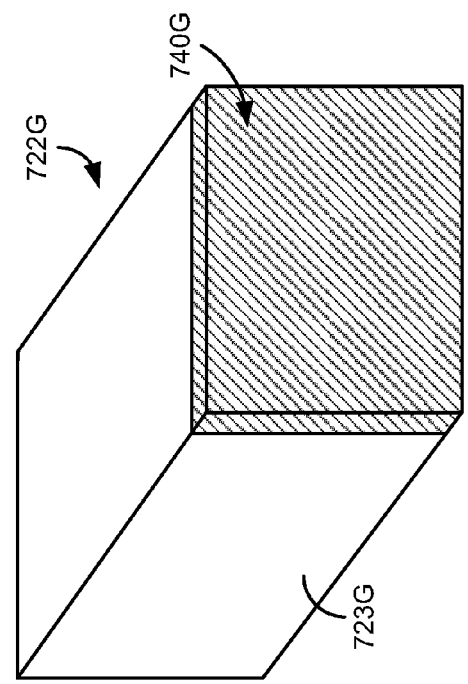
Figure 14:
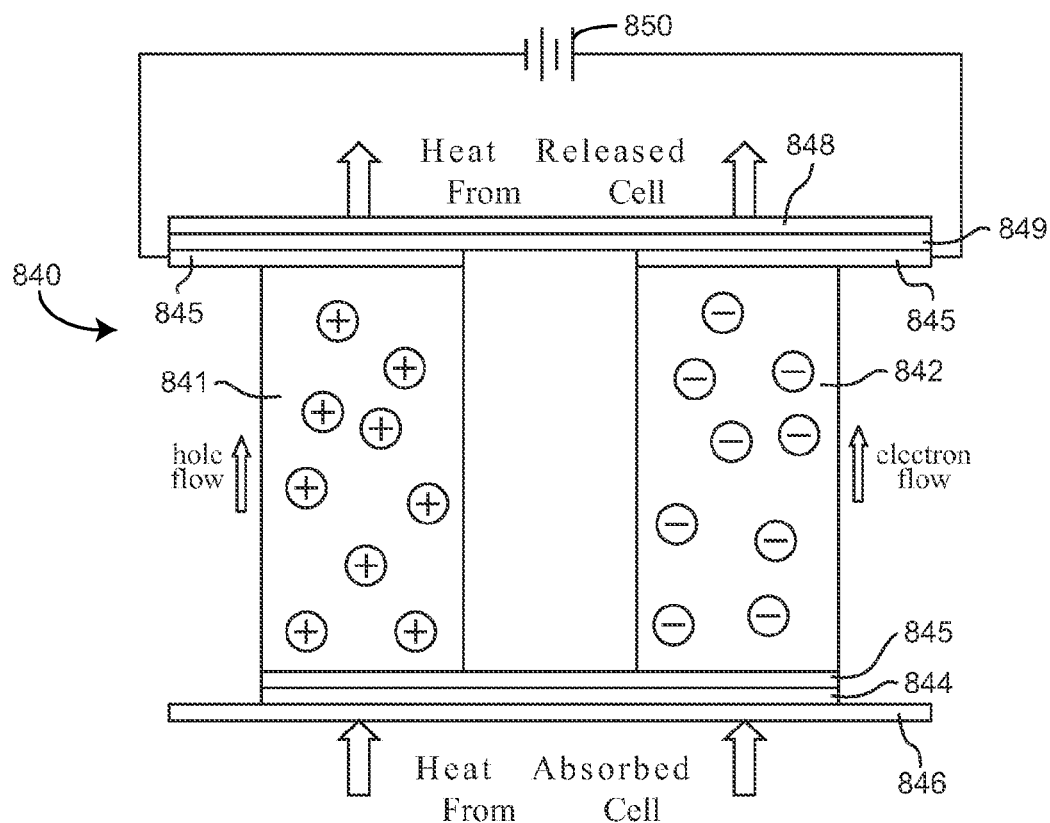
FIG. 14 is a detailed schematic diagram of a solid state coating for use in a thermal management system according to an exemplary embodiment.
Figure 15:
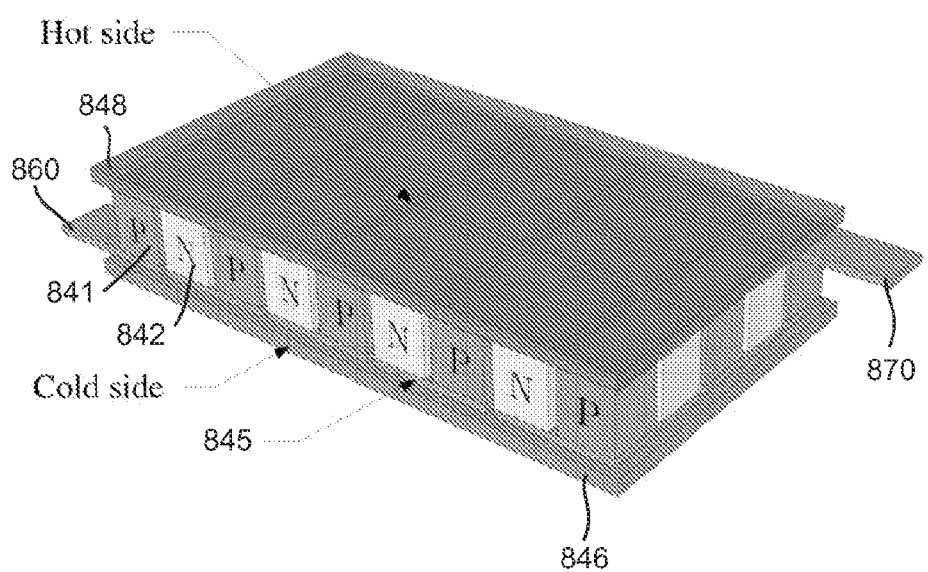
FIG. 15 is a detailed perspective view of a solid state coating for use in a thermal management according to an exemplary embodiment.

As shown in FIGS. 12A-15, the thermal management system utilizes the Peltier effect in order to heat and/or cool the cells. The Peltier effect is a thermoelectric effect that involves the conversion of electric voltage to a temperature differential and vice versa. According to an exemplary embodiment, by passing a single current through two different types of materials, a temperature difference will occur between the junction of the two different types of materials, creating one cool surface and one warm surface. It should be noted that while the specific components (i.e., the two different types of materials, the junctions, etc.) of the Peltier systems shown in FIGS. 12A-13H are shown schematically, the actual detailed arrangement of the components is shown in FIGS. 14-15.

It is noted that while the Peltier effect can be used for both heating and/or cooling, for efficacy reasons, the description provided below in relation to FIGS. 12A-15 will describe only cooling. However, one of ordinary skill in the art will readily recognize that the systems shown in FIGS. 12A-15 may also be used for heating of the cells of the battery module (e.g., by reversing the direction of the current flowing through the two different types of materials), and that a single Peltier effect system (i.e., the thermal management systems shown in FIGS. 12A-15) can be used for both heating and cooling.

Referring now to FIGS. 12A and 12B, a thermal management system 621 for an individual cell 624 is shown according to an exemplary embodiment. According to an exemplary embodiment, each individual cell 624 in a battery system (such as battery system 21 shown in FIGS. 3-4) may include such a thermal management system 621. According to another exemplary embodiment, only a predetermined number of individual cells 624 may include such a thermal management system 621.

According to an exemplary embodiment, the cell 624 includes a housing or container 625, a cap or cover 626, one or more terminals (e.g. positive terminal 627 and negative terminal 628), a cell element 630 (e.g., a wound cell element that includes at least one positive electrode or cathode, at least one negative electrode or anode, and one or more separators provided intermediate or between the positive and negative electrodes to electrically isolate them from each other), and an electrolyte. An insulator (e.g., an insulative wrap 636) may be provided about an outside or external surface of the cell element 630 and the inside surface of the housing 625.

The cell 624 also includes a negative current collector 632 and a positive current collector (not shown). The negative current collector 632 and the positive current collector are conductive members that are used to couple the electrodes of the cell element 630 to the terminals 627, 628 of the cell 624. For example, the negative current collector couples the negative electrode to the negative terminal 628 and the positive current collector couples the positive electrode to the positive terminal 627 of the cell 624 (e.g., by being conductively coupled to the housing 625 and the cover 626). According to an exemplary embodiment, the current collectors are coupled to the electrodes with a welding operation (e.g., a laser welding operation). As shown in FIG. 12A, the negative terminal 628 is electrically insulated from the cover 626 via an insulator 629.

According to an exemplary embodiment, the cell element 630 has a wound configuration in which the electrodes and separators are wound around a member or element provided in the form of a hollow tube or mandrel 634. Such a configuration may be referred to alternatively as a jelly roll configuration. Although the mandrel 634 is shown as being provided as having a generally cylindrical shape, according to other exemplary embodiments, the mandrel 634 may have a different configuration (e.g., it may have an oval or rectangular cross-sectional shape, etc.).

It is noted that the cell 624, although shown as having a generally cylindrical shape, may also have a different configuration (e.g., it may have an oval, prismatic, or other desired cross-sectional shape). For example, FIG. 12C shows a prismatic cell 624A having a thermal management system 621A (with similar features to those shown in FIG. 12B labeled with corresponding reference numbers having an "A" suffix). For efficacy, only the features of thermal management system 621 will be discussed in detail below. However, one of ordinary skill in the art will readily recognize that such a thermal management system is possible with other cell types, shapes, and configurations.

As part of the thermal management system 621, a solid state coating 640 is provided on the outside (e.g., external surface) of the cell 624. The solid state coating (e.g., a first metal 641 and a second metal 642) consists of a two-layer metal coating where the two metals are dissimilar (e.g., a p-type silicon and an n-type silicon, a p-type bismuth and an n-type bismuth, etc.) in order to take advantage of the Peltier effect. According to other exemplary embodiments, other suitable materials may be used (e.g., bismuth telluride, lead telluride, silicon germanium, bismuth-antimony (including bismuth antimony alloys), etc.). According to an exemplary embodiment, an electrically-insulating material or layer 644 may be provided between the outside of the housing 625 of the cell 624 and the solid state coating 640.

According to an exemplary embodiment, the solid state coating 640 may substantially cover the entire height of the cell 624, as shown in FIG. 12A. According to other exemplary embodiments, the solid state coating 640 may cover only a portion or portions of the height of the cell 624. For example, the solid state coating 640 may cover only the top half or top third of the cell 624, or the solid state coating 640 may cover only the bottom half or bottom third of the cell 624, or the solid state coating 640 may cover both a top portion of the side of the cell 624 and a bottom portion of the side of the cell 624. According to other exemplary embodiments, the solid state coating 640 may cover a portion or all of the top and/or bottom of the cell 624.

Additionally, for the prismatic cell shown in FIG. 12C, the solid state coating 640A may cover one or more sides of the cell 624A. For example, the solid state coating 640A may cover all or a portion of the four sides of the cell 624A (as shown in FIG. 12C). According to another exemplary embodiment, the solid state coating 640A may cover all or a portion of a single side of the cell 624A (e.g., only an end or a side of the cell 624A). Additionally, according to other exemplary embodiments, the solid state coating 640A may cover a portion or all of the top and/or bottom of the cell 624A.

Referring now to FIGS. 13A-13H, thermal management systems 721 are shown according to various exemplary embodiments. For efficacy reasons, the components of the various thermal management systems will be discussed below using general reference numbers not having a suffix (e.g., "A," "B," "C," "D," etc.), with the general reference numbers provided below referring to the specific components in each of FIGS. 13A-13H (where applicable).

According to the embodiments shown in FIGS. 13A-13D, as opposed to a solid state coating covering an individual cell (such as, e.g., shown in FIGS. 12A-C), a solid state coating 740 is provided within a battery module 722. According to one exemplary embodiment, the solid state coating 740 may be inside the housing 723 of the battery module 722 (e.g., as shown in FIGS. 13A-13D). According to another exemplary embodiment, the solid state coating 740 may be applied to the outside or external surface of the housing 723 of the battery module 722 (e.g., as shown in FIGS. 13E-13H).

According to an exemplary embodiment, an optional electrically-insulating material or layer 744 may be provided between the solid state coating 740 and the outside of the cells (e.g., as shown in FIGS. 13A-13D). Additionally, regarding FIGS. 13E-13H, an optional electrically-insulating material or layer (not shown) may be provided between the solid state coating 740 and the outside or external surface of the housing 723 of the battery module 722. It is noted that this optional electrically-insulating material or layer (when used) is electrically insulative but also thermally conductive so that the cell may be efficiently heated and/or cooled. An example of such an electrical insulating and thermally conductive material is MYLAR®.

According to an exemplary embodiment, the housing 723 may be manufactured from copper (or copper alloy), aluminum (or aluminum alloy), steel (or other metal), plastic (or other polymer), or any other suitable material.

According to an exemplary embodiment, as shown in FIGS. 13A and 13B, the solid state coating 740 substantially surrounds at least a portion of all of the cells 724 of the battery module 722. In FIG. 13A, the solid state coating 740 is provided in close proximity to the cells 724, but not in direct contact with the cells 724. As such, cooling (or heating) may take place through convection. Additionally, the cells 724 may be provided in contact with one another, so that cooling (or heating) may take place through conduction. According to an exemplary embodiment, the exterior of the cells 724 may include an optional electrically-insulative material (yet thermally conductive material) provided thereon to electrically insulate one cell from an adjacent cell (or the solid state coating).

According to the exemplary embodiment shown in FIG. 13A, a fan or similar device (such as fan 760A) is provided with the thermal management system 721. The fan is used to aid in the thermal transfer process by moving or forcing (e.g., circulating) the air or fluid within the battery module. Additionally, a fan may be provided outside the housing of the battery module (either in combination with or instead of the fan provided within the housing of the battery module) to aid in the thermal transfer process.

According to another exemplary embodiment, as shown in FIGS. 13B-13C, the solid state coating 740 substantially conforms to at least a portion of the external contour of the cells 724 of the battery module 722. In FIG. 13B, the solid state coating 740 may be provided in direct contact with the cells 724 (with or without optional electrically-insulative layer 744), or in close proximity to the cells 724. As such, cooling (or heating) may take place through conduction or convection, respectively. Additionally, the cells 724 may be provided in contact with one another, so that cooling (or heating) may also take place through conduction. According to an exemplary embodiment, the exterior of the individual cells 724 may include an optional electrically-insulative material (yet thermally conductive material) provided thereon to electrically insulate one cell from an adjacent cell (or the solid state coating).

According to another exemplary embodiment, as shown in FIG. 13C, the solid state coating 740 is provided along a row or column of cells 724. According to an exemplary embodiment, the solid state coating 740 may be in a substantially straight line or plane, or may be configured to substantially conform to at least a portion of the external contour of the cells 724 of the battery module 722 (e.g., as shown in FIG. 13C). In FIG. 13C, the solid state coating 740 may be provided in direct contact with the cells 724 (with or without optional electrically-insulative layer 744), or in close proximity to the cells 724. As such, cooling (or heating) may take place through conduction or convection, respectively. Additionally, the cells 724 may be provided in contact with one another, so that cooling (or heating) may also take place through conduction. According to an exemplary embodiment, the exterior of the individual cells 724 may include an optional electrically-insulative material (yet thermally conductive material) provided thereon to electrically insulate one cell from an adjacent cell (or the solid state coating). Additionally, a fan may be provided with the battery module 722 to aid in the thermal transfer process, i.e., to aid in convection cooling (or heating).

According to an exemplary embodiment, the cells 724 are cylindrical cells (e.g., as shown in FIGS. 13A-13C). According to another exemplary embodiment, the cells 724 are prismatic cells (e.g., as shown in FIG. 13D). In FIG. 13D, the solid state coating 740 is provided in close proximity to the cells 724, but not in direct contact with the cells 724. As such, cooling (or heating) may take place through convection. Additionally, the cells 724 may be provided in contact with one another, so that cooling (or heating) may take place through conduction. According to an exemplary embodiment, the exterior of the cells 724 may include an optional electrically-insulative material (yet thermally conductive material) provided thereon to electrically insulate one cell from an adjacent cell (or the solid state coating). Additionally, a fan (such as fan 760A shown in FIG. 13A) may be provided with the battery module to aid in the thermal transfer process (i.e., to aid in convection cooling or heating).

As shown in FIGS. 13A-13D, the solid state coating 740 is provided within the housing 723 of the battery module 722. According to one exemplary embodiment, the solid state coating 740 is provided on an inside or internal surface of the housing 723. According to an exemplary embodiment, an optional electrically-insulative material (yet thermally conductive material) may be provided in between the solid state coating 740 and the inside surface of the housing 723. According to another exemplary embodiment, the solid state coating 740 may not be in contact with the inside surface of the housing 723.

According to other various exemplary embodiments, the solid state coating 740 may be provided on a part or portion of the outside or external surface of the housing 723 of the battery module 722 (e.g., as shown in FIGS. 13E-13H). For example, as shown in FIG. 13E, the solid state coating 740 is provided on a portion of an end of the housing 723. According to another exemplary embodiment, as shown in FIG. 13F, the solid state coating 740 is provided on a portion of an end of the housing 723 and on a portion of a side of the housing 723.

According to another exemplary embodiment, as shown in FIG. 13G, the solid state coating 740 is provided on an end of the housing 723 such that the solid state coating substantially covers the entire end of the housing 723. According to another exemplary embodiment, as shown in FIG. 13H, the solid state coating 740 is provided over an entire end of the housing 723 and over an entire side of the housing 723.

It should be noted that many different configurations and arrangements of the solid state coating 740 are possible, and that those shown in FIGS. 13A-13H are mere examples of a limited number of such possibilities. One of ordinary skill in the art would readily recognize that many more configurations and arrangements are possible and included within the scope of this application.

According to an exemplary embodiment, the solid state coating 740 may be provided adjacent a top portion of an end and/or side of the housing 723 (e.g., as shown in FIGS. 13E-13F). In this embodiment, the location of the solid state coating 740 is chosen to aid in the natural circulation of air (or other fluid) within the housing 723 (e.g., circulation of the air or fluid by convection). For example, when using the solid state coating 740 to provide cooling to the cells, heat is absorbed from the cells 724 along or near the top of the housing 723. Because heat within the housing 723 naturally rises (e.g., due to the fact that hot air weighs less than cold air), placement of the solid state coating 740 along the top portion of the sides and/or ends of the housing 723 results in more efficient cooling.

According to an exemplary embodiment, a cooling plate and/or heat sink may be provided with the solid state coating 740 (e.g., such as shown in FIG. 14). The cooling plate and heat sink are configured to aid in the thermal transfer either within or outside the housing of the battery module. Additionally, the cooling plate and heat sink may aid in more even cooling and/or heating of the cells within the battery module.

To pass a current through the solid state coating of the various thermal management systems shown in FIGS. 12A-15, a voltage (e.g., a DC voltage) is applied to the solid state coating. According to an exemplary embodiment, the DC voltage may come from one or more of the cells and/or the battery system itself. For the embodiment shown in FIGS. 12A-12C, for example, each individual cell 624 may supply its own DC voltage (e.g., as represented by power supply 650 in FIG. 12A), or the DC voltage may come from the battery system. For the embodiments shown in FIG. 13A-13D, for example, the battery module 722 may supply the DC voltage. According to another exemplary embodiment, the DC voltage (for the embodiments in FIGS. 12A-13D) may come from an external source (e.g., such as a 12V starting battery for the vehicle, or a standard 110V alternating current (AC) wall outlet that is then converted to a DC voltage).

According to various exemplary embodiments, such as shown in FIGS. 13A-13D, the power source or supply 750 may be located inside or outside of the battery housing 723 or battery module 722. According to another exemplary embodiment, in the case of multiple solid state coating systems, such as shown in FIG. 13C, a separate power source 750 is provided for each solid state coating system 740. According to other exemplary embodiments, a single, common power source 750 is provided for multiple solid state coating systems 740.

According to another exemplary embodiment, the thermal management system 621, 721 is configured to receive power from a standard 110V alternating current (AC) wall outlet. In this case, the 110 AC voltage would be converted to DC voltage. According to one exemplary embodiment, an AC/DC converter may be provided as part of the battery module or battery system.

According to another exemplary embodiment, the thermal management system 621, 721 may need to be operated only when the battery system is being charged, for example, when the vehicle is parked and the battery system is plugged into a standard 110 AC voltage wall outlet. In this case, the battery system may not need cooling provided by the thermal management system while the vehicle is in use. However, the battery system (and components thereof) may still be cooled (e.g., by passive cooling) by air movement through and/or around the battery system while the vehicle is moving.

Referring to FIG. 14, a detailed schematic diagram of a single junction of a solid state coating 840 (e.g., such as used in the thermal management systems 621, 721) is shown according to an exemplary embodiment. A first metal 841 (e.g., p-type material) is electrically connected (e.g., via a conductor 845) to a second metal 842 (e.g., n-type material) in series. A current is passed through the solid state coating 840 by applying a voltage (e.g. from power source 850) to the free ends of the first and second metals 841, 842. Heat is carried (e.g., moved, transferred, etc.) from the cell (e.g., from an optional cooling plate 846) to the opposite side of the solid state coating 840 (e.g., to an optional heat sink 848) by positive charge carriers (holes) in the p-type material and negative charge carriers (electrons) in the n-type material.

In practice, multiple pairs of junctions are electrically connected together (e.g., using conductors 845) in series (e.g., such as shown in FIG. 15) to create one large solid state coating 840 having a first or positive connector 860 and a second or negative connector 870. Although the solid state coating 840 shown in FIG. 15 is relatively flat, the solid state coating 840 may have other shapes according to other exemplary embodiments (e.g., such as shown in various embodiments of FIGS. 12A-12B and 13B-13C).

According to one exemplary embodiment, the cooling plate 846 and/or heat sink 848 may be manufactured from copper (or copper alloy), aluminum (or aluminum alloy), or other suitable material. According to another exemplary embodiment, the cooling plate 846 and/or heat sink 848 may be excluded from the design. It should be noted that if the current flowing through the solid state coating 840 is reversed, heating of the cells can be accomplished. Accordingly, in this embodiment, heat is absorbed by the heat sink 848 (which is acting as a cooling plate), passed through the solid state coating 840, and then released from the cooling plate 846 (which is acting as a heat sink).

Depending on whether the outside of the cell (e.g., the cell housing) is charged or not, an optional electrically-insulating material or layer 844 may be provided between the solid state coating 840 and the outside of the cell (e.g., between the optional cooling plate 846 and the conductor 845). Additionally, an optional electrically-insulating material or layer 849 may be provided between the solid state coating 840 and the external environment (e.g., between the conductor 845 and the optional heat sink 848). It is noted that these optional electrically-insulating materials or layers (when used) are electrically insulative but also thermally conductive so that the cell may be efficiently heated and/or cooled. An example of such an electrical insulating and thermally conductive material is MYLAR®.

Through the use of the Peltier effect, a current applied to the solid state coating 840 (via a direct current (DC) voltage) produces a temperature gradient that is used to cool the cells. Heat is absorbed on the cool side of the solid state coating (i.e., the side adjacent the body of the cell), while heat is rejected from the hot side of the solid state coating 840 (i.e., the side away from the body of the cell). As stated above, if the direction of the current is reversed, the solid state coating 840 may be used to heat the cells.

Use of the solid state coating to cool (and/or heat) the cells offers several advantages. One, there are no moving parts or components, resulting in very little or no maintenance of the cooling system. The solid state system also requires no refrigerants, such as potentially harmful CFCs. Also, the cooling/heating system can be easily controlled (by voltage and current), allowing accurate and efficient temperature control of the cells.

According to another exemplary embodiment, a fan or similar device (such as fan 760A shown in FIG. 13A) may be provided with the thermal management systems shown in FIGS. 5-15 and described above. For example, a fan may be used to aid in the thermal transfer process by moving or forcing (e.g., circulating) the air or fluid within the battery module. Additionally, a fan may be provided outside the housing of the battery module (either in combination with or instead of the fan provided within the housing of the battery module) to aid in the thermal transfer process. According to another exemplary embodiment, the various thermal management systems may be configured to receive forced air (e.g., while the vehicle is moving) to aid the thermal transfer process. In this embodiment, the fan provided external to the housing of the battery module may simply be turned off (or not provided at all).

Figure 16:
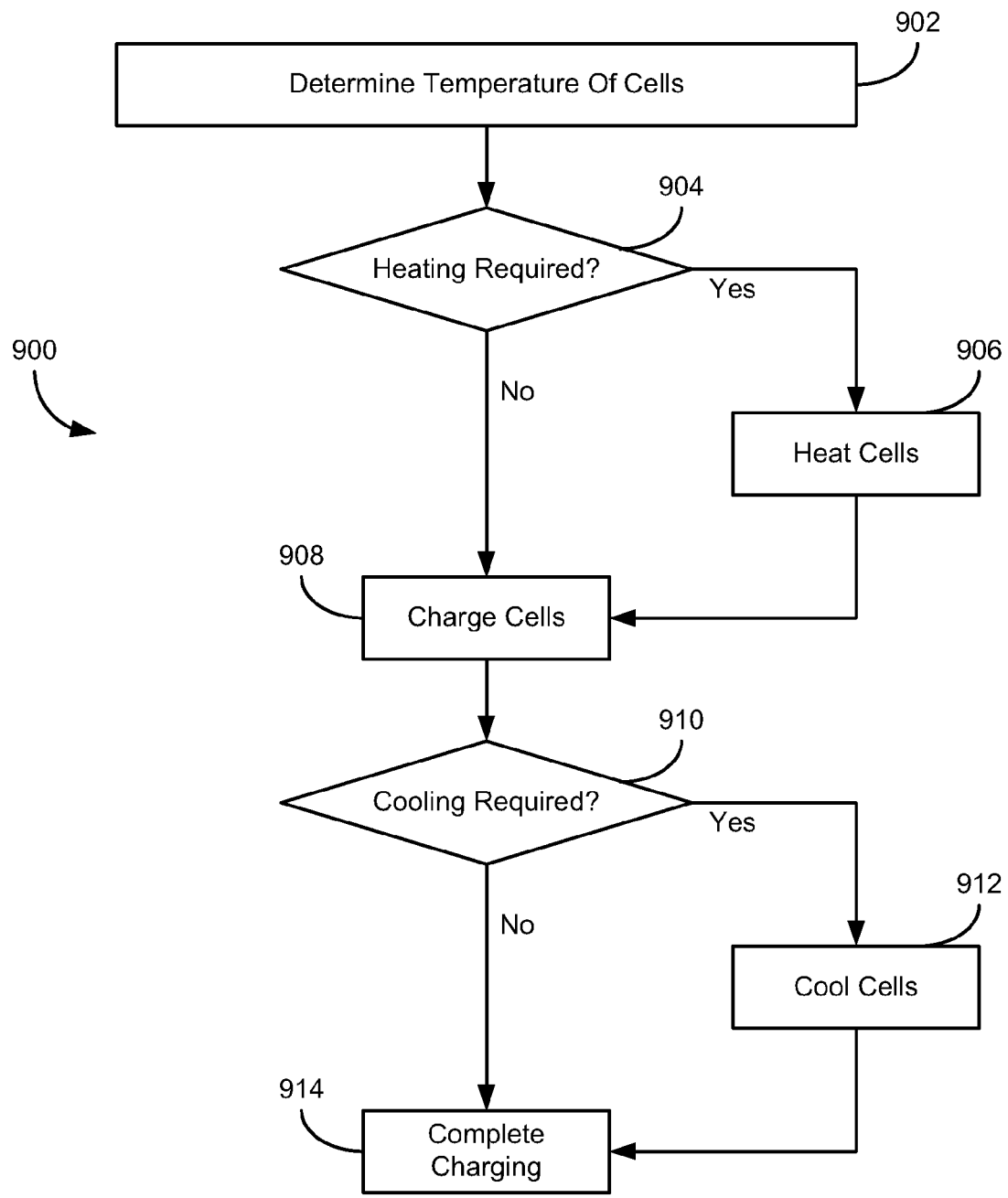
FIG. 16 is a flowchart of a method of providing thermal management to a battery system according to an exemplary embodiment.

Referring now to FIG. 16, a flow chart of a method 900 of providing thermal management to a battery system is shown according to an exemplary embodiment. The method 900 includes a first step 902 of determining the temperature of the cells of the battery system. This may be done, for example, by obtaining the temperature of a thermal sensor that is provided on or near at least one or some of the cells.

The method 900 also includes a second step 904 of determining whether heating of the cells is required. According to an exemplary embodiment, if the temperature of the cells is less than a first predetermined temperature, the cells will be heated (e.g., by any of the thermal management systems shown in FIGS. 5-15) in a third step 906 of the method 900.

According to one exemplary embodiment, the first predetermined temperature is about zero degrees Celsius. According to other exemplary embodiments, the first predetermined temperature is between negative 10 degrees Celsius and positive 10 degrees Celsius. However, according to other exemplary embodiments, the first predetermined temperature may be any suitable temperature.

The method 900 also includes a fourth step 908 of charging the cells. According to an exemplary embodiment, charging of the cells begins once the temperature of the cells reaches (or exceeds) the first predetermined temperature. According to one exemplary embodiment, heating of the cells may continue during charging of the cells. For example, the cells may be heated (while still being charged) until the temperature of the cells reaches (or exceeds) a second predetermined temperature. Once the cells reach the second predetermined temperature, the heating of the cells stops, but the charging continues (i.e., for as long as charging is needed). According to another exemplary embodiment, the cells may not be heated during charging of the cells.

According to one exemplary embodiment, the second predetermined temperature is about 25 degrees Celsius. According to other exemplary embodiments, the second predetermined temperature is between 10 degrees Celsius and 35 degrees Celsius. However, according to other exemplary embodiments, the second predetermined temperature may be any suitable temperature.

The method 900 also includes a fifth step 910 of determining whether cooling of the cells is needed during the charging the cells. According to an exemplary embodiment, if the temperature of the cells is greater than a third predetermined temperature, the cells will be cooled (e.g., by any of the thermal management systems shown in FIGS. 5-15) in a sixth step 912 of the method 900.

According to one exemplary embodiment, the third predetermined temperature is about 30 degrees Celsius. According to other exemplary embodiments, the third predetermined temperature is between 15 degrees C. and 45 degrees Celsius. However, according to other exemplary embodiments, the third predetermined temperature may be any suitable temperature.

According to one exemplary embodiment, charging of the cells continues during cooling of the cells. For example, once the cells reach (or exceed) the third predetermined temperature, cooling of the cells begins with the cells continuing to be charged. According to an exemplary embodiment, the thermal management system strives to maintain the cells at a fourth predetermined temperature during charging of the cells. According to one exemplary embodiment, the fourth predetermined temperature is equal to a temperature in the range between the second predetermined temperature (i.e., the temperature where heating of the cells is stopped) and the third predetermined temperature (i.e., the temperature where cooling of the cells first began).

In this embodiment, cooling of the cells continues until the temperature of the cells drops back down to the second predetermined temperature. Once the temperature of the cells reaches the second predetermined temperature, the cooling of the cells stops, but the charging continues (i.e., for as long as charging is needed). If charging continues and the temperature of the cells again reaches the third predetermined temperature, cooling of the cells begins again.

According to another exemplary embodiment, the fourth predetermined temperature is equal to the third predetermined temperature (i.e., the temperature where cooling of the cells begins). In this embodiment, cooling of the cells occurs so that the temperature of the cells is maintained (or closely maintained in a range several degrees above and below) at the third predetermined temperature. Once the temperature of the cells drops back below the third predetermined temperature (or a predetermined amount below the third predetermined temperature), the cooling of the cells stops, but the charging continues (i.e., for as long as charging is needed). If charging continues and the temperature of the cells again reaches (or exceeds) the third predetermined temperature, cooling of the cells begins again.

According to another exemplary embodiment, the fourth predetermined temperature is equal to some other suitable temperature (or range of temperatures). According to another exemplary embodiment, the cells may not be charged during cooling of the cells. That is, the charging of the cells may stop until the cells are cooled back down to a predetermined temperature (e.g., the fourth predetermined temperature).

Finally, the method 900 includes a seventh step 914 of completing charging. Once the cells have reached full charge, charging of the cells is stopped. According to an exemplary embodiment, once charging is stopped, heating and/or cooling of the cells is also stopped (i.e., if heating or cooling is occurring). According to another exemplary embodiment, heating and/or cooling of the cells may continue (e.g., until the temperature of the cells reaches a predetermined temperature).

According to another exemplary embodiment, the thermal management systems 621, 721 (shown in FIGS. 12A-13H and described above) may be utilized in method 900. For example, if the cells require heating as determined in second step 904 (e.g., the temperature of the cells is less than a first predetermined temperature), a current is applied (in a first direction) to the solid state coating 640, 740 of the thermal management system 621, 721 in order to provide heat to the cells of the battery system. Then, once the cells have been sufficiently warmed (e.g., the temperature of the cells has reached (or exceeded) the first predetermined temperature), charging of the cells begins.

Heating of the cells may continue (during charging) until the temperature of the cells reaches a predetermined temperature (e.g., the temperature of the cells has reached (or exceeded) the second predetermined temperature). Alternatively, charging may occur without any heating of the cells by the thermal management system 621, 721. It should be noted that the temperature of the cells may continue to rise due to the charging of the cells. In either case, once heating of the cells is no longer required, the current to the solid state coating 640, 740 is stopped or turned off.

Once the temperature of the cells has reached a predetermined temperature (e.g., the temperature of the cells has reached (or exceeded) the third predetermined temperature), cooling of the cells occurs. According to this exemplary embodiment, a current is applied (in a second direction opposite the first direction) to the solid state coating 640, 740 of the thermal management system 621, 721 in order to provide cooling to the cells. Cooling of the cells may continue until a setpoint temperature is reached (e.g., the temperature of the cells has reached (or exceeded) the fourth predetermined temperature), or until charging of the cells is completed. In either case, once cooling of the cells is no longer required, the current to the solid state coating 640, 740 is stopped or turned off.

Utilizing the thermal management systems 621, 721 with method 900 offers several advantages. One such advantage is that the heating and/or cooling of the cells can easily take place during charging of the cells of the battery system (e.g., when the vehicle is parked overnight in a garage). Further, the thermal management system 621, 721 requires no moving parts or forced fluid flow (although it should be noted that the thermal management system 621, 721 may optionally use a fan (either inside or outside of the battery system) for aiding in the thermal transfer process). Further, the thermal management system 621, 721 can easily and efficiently switch from a heating mode to a cooling mode (or vice versa), e.g., by simply reversing (i.e., changing the direction of) the current through the solid state coating 640, 740. In this way, the cells of the battery system can easily be kept at a temperature (or a range of temperatures) where the cells have an optimum charge acceptance (i.e., where the cells have a temperature high enough to have a low internal resistance, but also a temperature low enough so the cells do not age unnecessarily fast).

It should be noted that the thermal management systems shown in the other embodiments of this application (e.g., those shown in FIGS. 5-11) may also be utilized to carry out method 900, as one of ordinary skill in the art would readily recognize.

It should be also noted that all of the possible variations and alternatives described herein and shown in FIGS. 1-16 may apply to any and all of the separate embodiments included in this application. For example, the thermal management systems of FIGS. 12A-13H may be combined with any of the other thermal management systems as shown in FIGS. 5-11. For instance, a battery system having a Peltier effect thermal management system, such as shown in FIGS. 12A-13H, may be provided with cooling air from a thermal management system such as shown in FIGS. 5-11. Thus, the Peltier effect thermal management system will cool the cells, while the cooling air or heat pump will carry away the rejected heat from the exterior solid state coating of the Peltier effect thermal management system.

According to an exemplary embodiment, a battery system includes a plurality of electrochemical cells and a thermal management system configured to heat and/or cool the electrochemical cells. The thermal management system may include an inlet, an outlet, and at least one control valve configured to direct heating and/or cooling fluid to the battery system in order to heat and/or cool the cells. The inlet may be connected to a single source, dual source, or triple source of heating and/or cooling fluid.

According to another exemplary embodiment, the thermal management system may also include a heat pump configured to heat and/or cool the electrochemical cells. The heat pump includes a working fluid that is circulated by a compressor through a condenser, an expansion valve, and an evaporator. The heat pump may be provided as an integral system within the battery system, or may be provided outside of the battery system.

According to another exemplary embodiment, the thermal management system may also include a Peltier effect solid state coating that at least partially surrounds the electrochemical cells in order to heat and/or cool the electrochemical cells. The solid state coating may at least partially surround each individual electrochemical cell, or may at least partially surround a group of electrochemical cells.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the thermal management system for a battery system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery system comprising:
a plurality of electrochemical cells provided within a housing; and
a thermal management system configured to provide at least one of heating or cooling to the plurality of electrochemical cells only in response to the plurality of electrochemical cells being charged, the thermal management system comprising a solid state coating comprising a first metal and a second metal different from the first metal, wherein the solid state coating is configured to pass a current therethrough to create a temperature differential across a first surface of the solid state coating and a second surface of the solid state coating to provide the at least one of heating or cooling to the cells.

2. The battery system of claim 1, wherein the solid state coating is provided external to the housing of the battery system.

3. The battery system of claim 2, wherein at least a portion of the housing of the battery system is contoured to complement at least a portion of the plurality of electrochemical cells provided therein.

4. The battery system of claim 2, wherein the solid state coating covers a portion of the housing of the battery system.

5. The battery system of claim 2, wherein the solid state coating covers a complete side of the housing of the battery system.

6. The battery system of claim 2, further comprising a fan provided within the housing of the battery system, wherein the fan is configured to aid in thermal transfer within the battery system.

7. The battery system of claim 2, further comprising an electrically-insulative material provided between the solid state coating and the housing of the battery system.

8. The battery system of claim 1, further comprising a fan located outside of the housing of the battery system, wherein the fan is configured to aid in thermal transfer from the battery system.

9. The battery system of claim 1, wherein the solid state coating is provided on an external surface of at least one electrochemical cell of the plurality of electrochemical cells.

10. The battery system of claim 9, further comprising an electrically-insulative material provided between the solid state coating and the external surface of at least one electrochemical cell of the plurality of electrochemical cells.

11. The battery system of claim 9, wherein the solid state coating covers at least a portion of the external surface of the at least one electrochemical cell.

12. The battery system of claim 1, further comprising at least one of a cooling plate or a heat sink coupled to the solid state coating.

13. The battery system of claim 1, wherein the current applied to the solid state coating is supplied by a direct current (DC) power source external to the battery system.

14. The battery system of claim 1, wherein the current applied to the solid state coating is provided from a component external the battery system.

15. A method of providing thermal management to a battery system, the method comprising:
providing a thermal management system configured to provide at least one of heating or cooling to a plurality of electrochemical cells only in response to the plurality of electrochemical cells being charged, the thermal management system comprising a solid state coating comprising a first metal and a second metal different from the first metal, wherein the solid state coating is configured to pass a current therethrough to create a temperature differential across a first surface of the solid state coating and a second surface of the solid state coating to provide the at least one of heating or cooling to the plurality of electrochemical cells; and
applying the current in a first direction to the solid state coating to heat the plurality of electrochemical cells or in a second direction to the solid state coating to cool the plurality of electrochemical cells.

16. A battery system, comprising:
an electrochemical cell; and
a thermal management system that utilizes a peltier effect to heat or cool the electrochemical cell, wherein the thermal management system is activated to heat or cool the electrochemical cell only in response to a charging current provided to the electrochemical cell.

17. The battery system of claim 16, wherein the thermal management system comprises a solid state coating comprising a first metal and a second metal different from the first metal, wherein the solid state coating is configured to pass a current therethrough to create a temperature differential across a first surface of the solid state coating and a second surface of the solid state coating to heat or cool the electrochemical cell.

18. The battery system of claim 16, wherein the thermal management system is configured to heat or cool the electrochemical cell through conduction.

19. The battery system of claim 18, wherein a thermally conductive, electrically insulative layer is arranged between an outer housing of the electrochemical cell and the thermal management system.

20. The battery system of claim 16, wherein the thermal management system includes a metal layer that is contoured to follow at least a portion of a curved outer surface of the electrochemical cell and is configured to conduct thermal energy to or from the electrochemical cell.

21. The battery system of claim 20, wherein the battery system comprises more than one electrochemical cell, and wherein the metal layer of the thermal management system is contoured to follow at least a portion of a curved outer surface of more than one electrochemical cell and is configured to conduct thermal energy to or from the more than one electrochemical cell.

22. The battery system of claim 16, wherein the thermal management system entirely surrounds the electrochemical cell in at least one plane.

23. The battery system of claim 16, wherein the thermal management system is configured to heat or cool the electrochemical cell through convection.

24. The battery system of claim 23, further comprising a housing, wherein the electrochemical cell is provided within the housing, and the thermal management system is coupled to the housing.

25. The battery system of claim 24, wherein the thermal management system is coupled to an outer surface of the housing.

26. The battery system of claim 24, further comprising an air movement device configured to circulate air in the housing.

* * * * *

UNITED STATES PATENT AND TRADEMARK OFFICE
CERTIFICATE OF CORRECTION

PATENT NO. : 9,620,827 B2
APPLICATION NO. : 13/704191
DATED : April 11, 2017
INVENTOR(S) : Houchin-Miller et al.

It is certified that error appears in the above-identified patent and that said Letters Patent is hereby corrected as shown below:

On the Title Page

On Page 2, in Item (56), under "U.S. PATENT DOCUMENTS", in Column 2, Line 1, please delete "Uemoto" and insert -- Uemoto et al. --.

On Page 2, in Item (56), under "U.S. PATENT DOCUMENTS", in Column 2, Line 6, please delete "Saito" and insert -- Saito et al. --.

In the Specification

In Column 7, Lines 22-23, please delete "thermal management system 231" and insert -- thermal management system 221 --.

In Column 7, Lines 24-25, please delete "thermal management system 231" and insert -- thermal management system 221 --.

In Column 7, Lines 39-40, please delete "thermal management system 231" and insert -- thermal management system 221 --.

In Column 10, Line 12, please delete "evaporator 536," and insert -- evaporator 538, --.

In the Claims

In Column 21, Line 58, in Claim 14, please delete "external the" and insert -- external to the --.

Signed and Sealed this
Twenty-second Day of May, 2018

Andrei Iancu
*Director of the United States Patent and Trademark Office*